Aug. 7, 1956   H. N. STEPHAN   2,757,579
HORIZONTAL BORING, DRILLING AND MILLING MACHINE
Filed Oct. 17, 1951   11 Sheets-Sheet 4

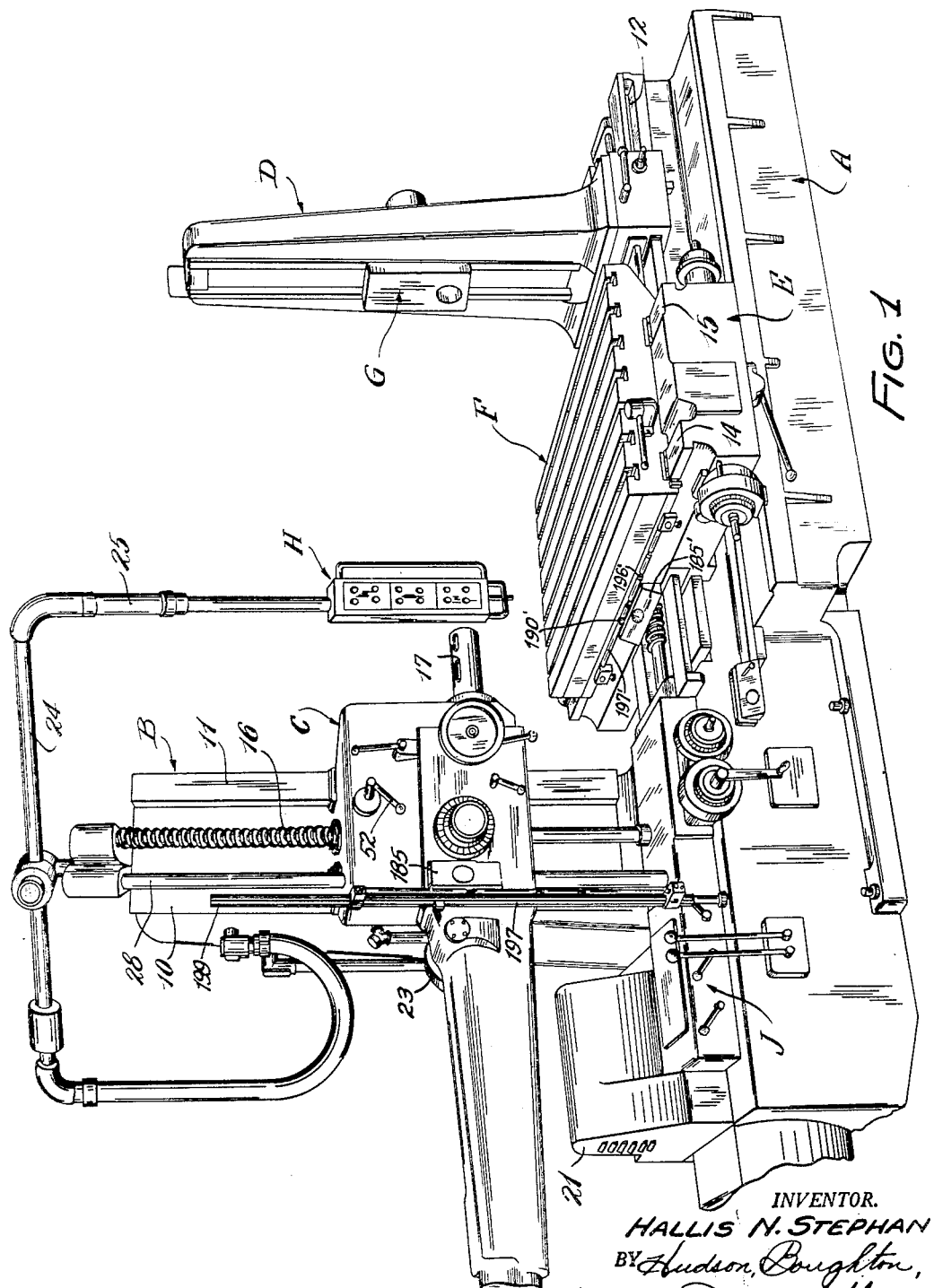

INVENTOR.
HALLIS N. STEPHAN
BY Hudson, Boughton,
Williams, David & Hoffmann
ATTORNEYS Aug. 7, 1956  H. N. STEPHAN  2,757,579
HORIZONTAL BORING, DRILLING AND MILLING MACHINE
Filed Oct. 17, 1951  11 Sheets-Sheet 5
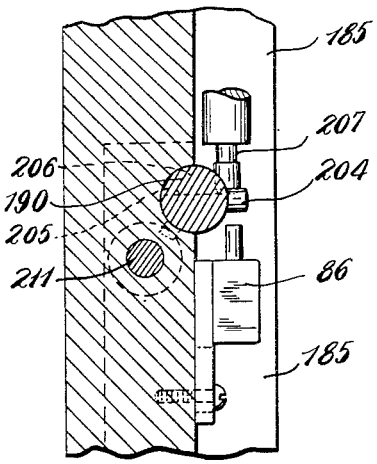
FIG. 11
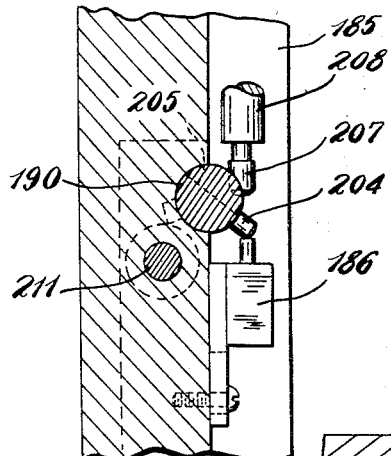
FIG. 12
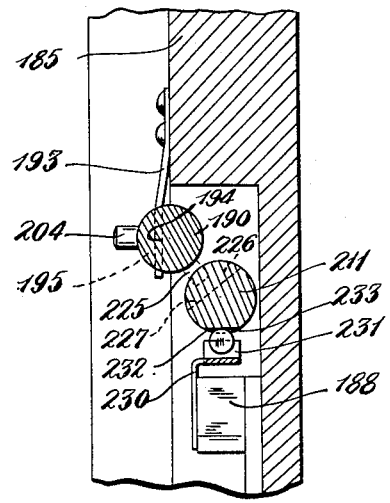
FIG. 14
FIG. 13
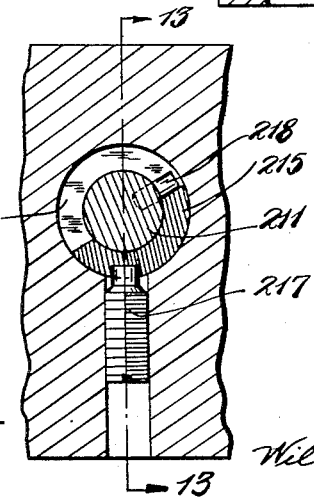
FIG. 15
INVENTOR.
HALLIS N. STEPHAN
BY Hudson, Boughton,
Williams, David & Hoffmann.
ATTORNEYS Aug. 7, 1956 H. N. STEPHAN 2,757,579
HORIZONTAL BORING, DRILLING AND MILLING MACHINE
Filed Oct. 17, 1951 11 Sheets-Sheet 6

INVENTOR.
HALLIS N. STEPHAN
BY Hudson, Boughton,
Williams, David & Hoffmann
ATTORNEYS Aug. 7, 1956  H. N. STEPHAN  2,757,579
HORIZONTAL BORING, DRILLING AND MILLING MACHINE
Filed Oct. 17, 1951  11 Sheets-Sheet 7

INVENTOR.
HALLIS N. STEPHAN
BY Hudson, Boughton,
Williams, David & Hoffmann
ATTORNEYS

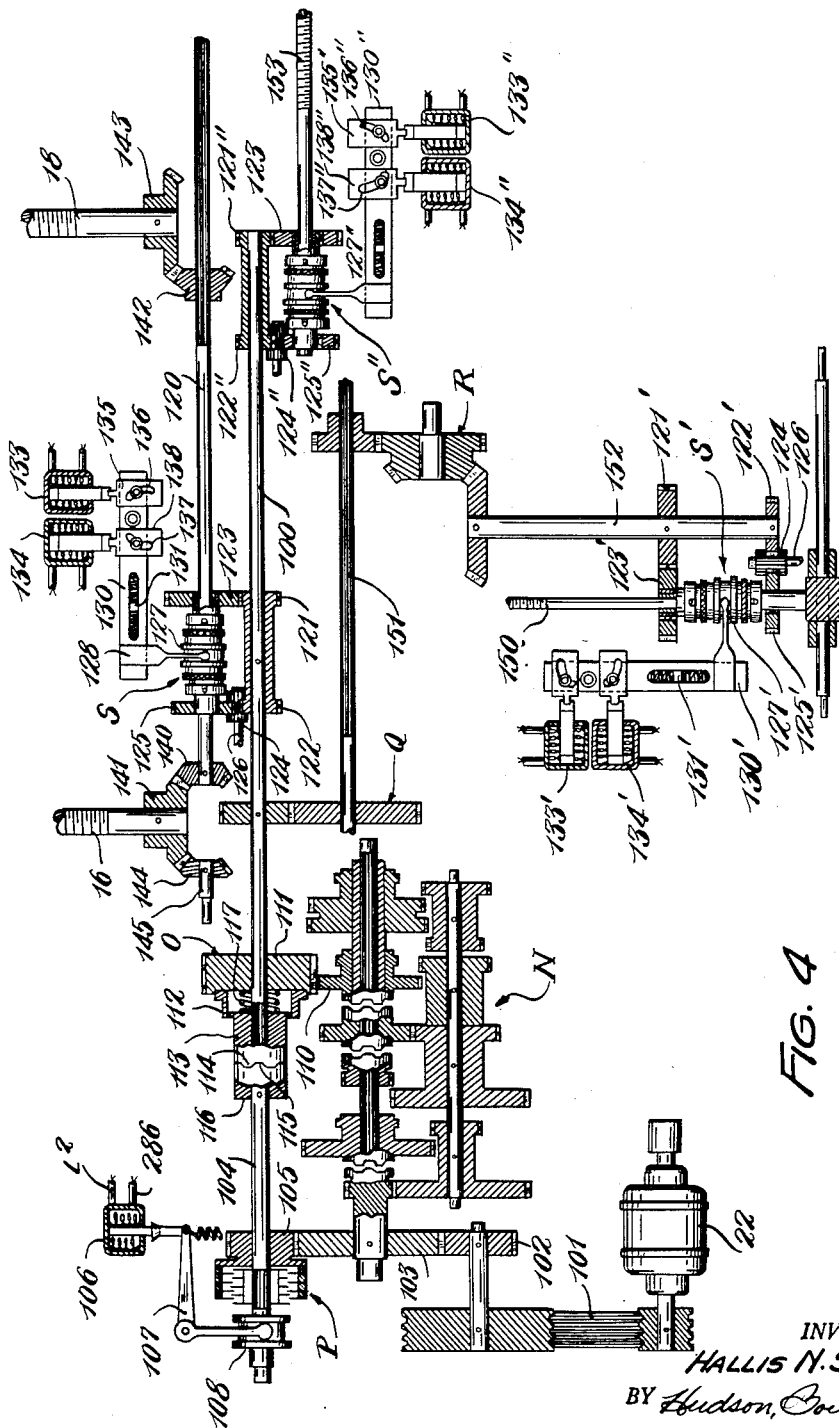

Aug. 7, 1956    H. N. STEPHAN    2,757,579
HORIZONTAL BORING, DRILLING AND MILLING MACHINE
Filed Oct. 17, 1951    11 Sheets-Sheet 10
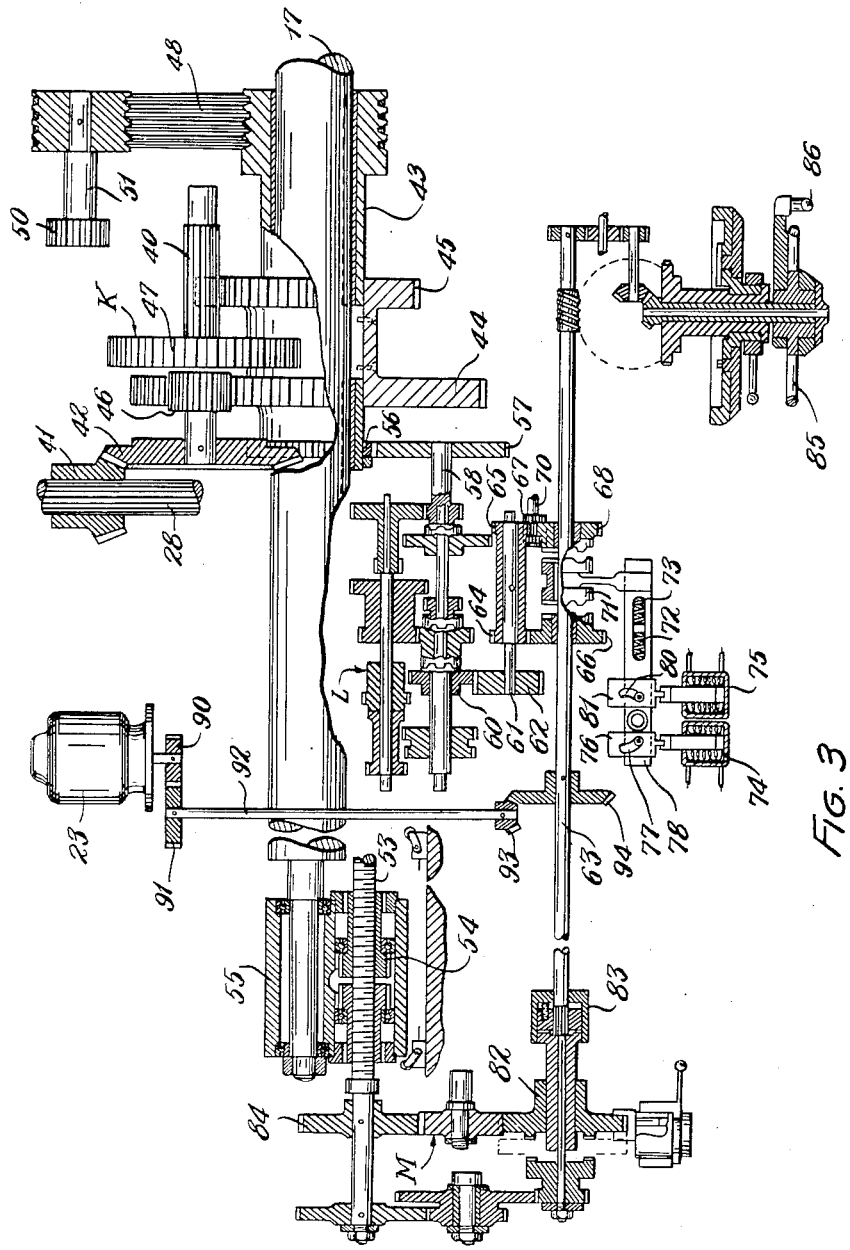
INVENTOR.
HALLIS N. STEPHAN
BY Hudson, Boughton,
Williams, David & Hoffmann
ATTORNEYS Aug. 7, 1956 H. N. STEPHAN 2,757,579
HORIZONTAL BORING, DRILLING AND MILLING MACHINE
Filed Oct. 17, 1951 11 Sheets-Sheet 11

INVENTOR.
HALLIS N. STEPHAN
BY Hudson, Boughton,
Williams, David & Hoffmann.
ATTORNEYS United States Patent Office 2,757,579
Patented Aug. 7, 1956

2,757,579

HORIZONTAL BORING, DRILLING AND MILLING MACHINE

Hallis N. Stephan, Cleveland Heights, Ohio, assignor to The New Britain Machine Company, New Britain, Conn., a corporation of Connecticut Application October 17, 1951, Serial No. 251,699

6 Claims. (Cl. 90—16)

The present invention relates to machine tools comprising power actuated mechanism for automatically indexing or positioning a movable machine tool element thereof to or in a predetermined desired position to within a fraction of a thousandth of an inch in response to the actuation of a control element. The invention more particularly relates to combined horizontal boring, drilling, and milling machines comprising power indexing or positioning mechansm of the character referred to.

The principal object of the invention is the provision of a novel and improved machine tool and, more particularly, a combination horizontal boring, drilling and milling machine comprising power actuated or driven mechanism for indexing or sequentially positioning a movable machine tool element automatically to or in a plurality of predetermined positions to within a fraction of a thousandth of an inch merely by operation of a control member to initiate movements of the machine tool element, and which mechanism can, with little if any change therein, be conveniently used with conventional end measuring rods.

A more specific object of the invention is the provision of a novel and improved machine tool and, more particularly, a combination horizontal boring, drilling and milling machine comprising power actuated or driven mechanism for indexing or successively positioning a movable machine tool element thereof automatically to or in a plurality of predetermined positions to within a fraction of a thousandth of an inch merely by actuation of a control element, and which mechanism includes a detachable or removable rodlike member having a plurality of abutments spaced longitudinally therealong at predetermined positions and a member adapted to travel along the rod and engaging the abutments for controlling the positioning of the machine tool element.

The invention resides in certain constructions and combinations and arrangements of parts and further objects and advantages thereof will be apparent to those skilled in the art to which the invention relates from the following description of the preferred embodiment described with reference to the accompanying drawings forming a part of this specification in which similar reference characters designate corresponding parts and in which Fig. 1 is a perspective view of a combined horizontal boring, drilling and milling machine embodying the present invention;

Fig. 3 is a diagrammatic view of that portion of the drive for the tool spindle which is located in the spindle head;

Fig. 4 is a diagrammatic view showing the drive for reciprocating the spindle head, saddle, and table;

Fig. 11 is a fragmentary, sectional view approximately on the line 11—11 of Fig. 10;

Fig. 12 is a view similar to Fig. 11 but showing the parts in a different operating position;

Fig. 13 is a sectional view approximately on the line 13—13 of Figs. 10 and 15;

Fig. 14 is a sectional view approximately on the line 14—14 of Fig. 10;

Fig. 15 is a sectional view approximately on the line 15—15 of Fig. 13;

Figure 19:
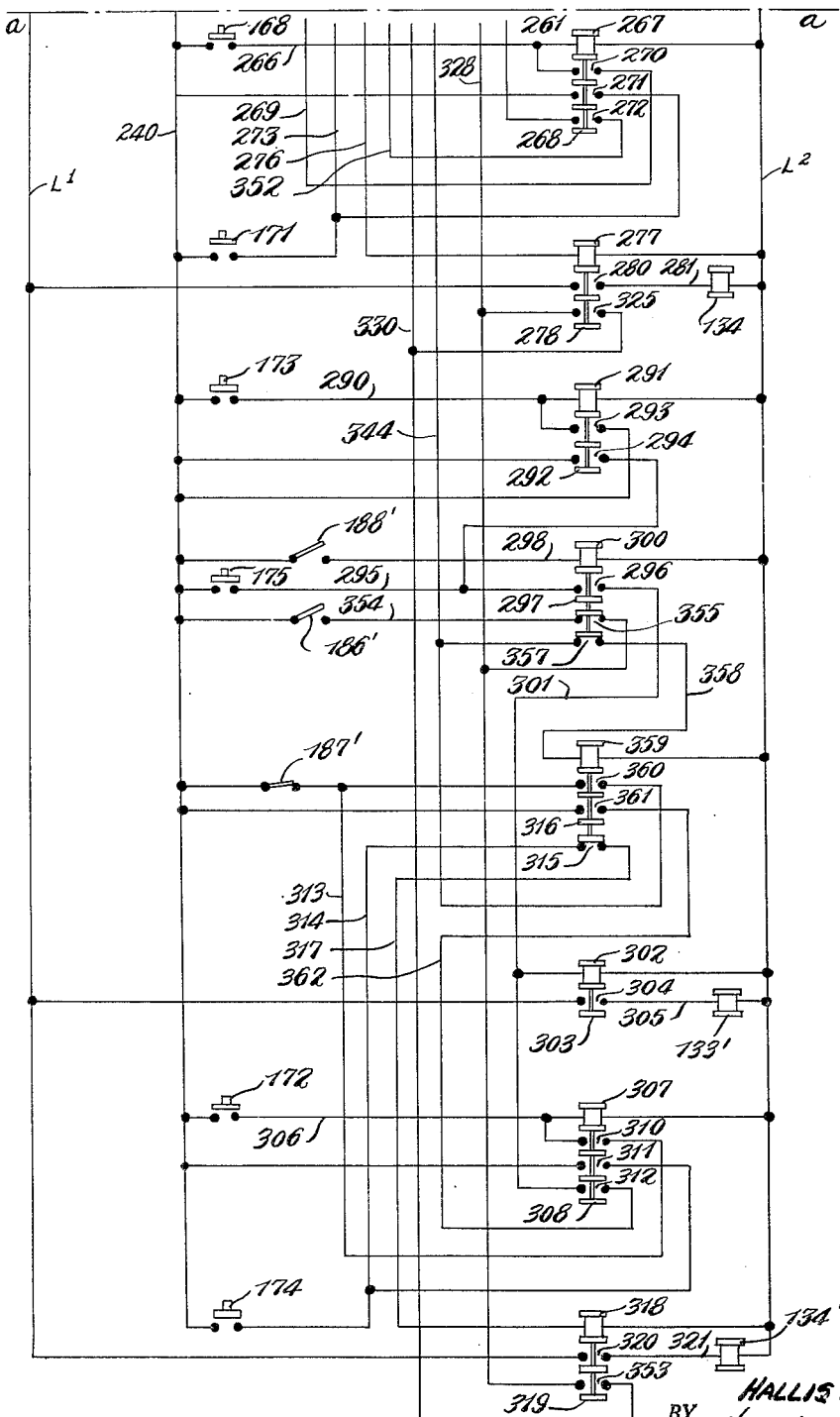
Figs. 18 and 19 are wiring diagrams of that part of the electrical mechanism of the machine which is involved in the present invention.

Although the invention is susceptible of various modifications and alternative constructions, it is particularly applicable to and is herein shown and described as embodied in a combined horizontal boring, drilling and milling machine of the general character shown in U. S. Patent No. 2,350,174 issued May 30, 1944.

Referring to the drawings, the machine shown therein comprises a base A, provided at one end with a spindle head column B formed with vertical ways 10 and 11 upon which a spindle head C is mounted for vertical movement, and at the other end with a backrest or outboard support column D slidably supported on a pair of horizontal ways 12, only one of which appears in the drawings, formed on the upper side of the bed. The ways 12 and 13 also support a saddle E having transverse horizontal ways 14 and 15 on the upper side which in turn support a work table F. The backrest column D is provided with vertical ways upon which a backrest block G is mounted for vertical movement.

The spindle head is adapted to be moved vertically along the ways 10 and 11 by a lead screw 16 rotatably supported in the machine in a suitable manner and having threaded engagement with a nut fixed in the spindle head. In addition to being rotatable in opposite directions, the tool spindle 17 is movable in opposite directions longitudinally of its axis of rotation at different speeds to effect both feed and rapid movements. The backrest block or outboard support G is movable simultaneously with the movement of the spindle head C by a vertical lead screw 18 located within the backrest column D and connected to the drive for rotating the screw 16. The saddle E is movable longitudinally of the tool spindle along the ways 12 and the table F is movable transversely of the tool spindle along the ways 14 and 15 at different speeds by mechanism hereinafter specifically referred to.

The speed and direction of rotation of the spindle, etc., and the aforesaid movements of the various machine tool elements, such as the feed and rapid movements of the spindle, head, saddle, table, etc., are performed by power and their operation may be controlled from any convenient place about the machine. The machine illustrated includes a reversible spindle drive motor 20 arranged for ceiling mounting and enclosed within the guard 21 adjacent to the left-hand end of the machine, a reversible feed motor 22 also located within the guard 21, and a reversible spindle rapid traverse motor 23 mounted on the spindle head C. Other motors are employed but their location and operation are not necessary to an understanding of the present invention.

The spindle drive motor 20 produces the spindle rotation and spindle feed movements. The feed motor 22 produces the feed and rapid movements of the spindle head C, saddle E and table F. The spindle rapid motor 23 produces the rapid movement of the spindle. The motors referred to are selectively connected to the various operating mechanisms through the medium of suitable speed change transmissions, clutches, etc., the controls for which are located on or adjacent to the base A of the machine, spindle head C, pendant control station H fixed to the lower end of a tubular rod connected to a universally movable arm 24 by a flexible cable 25, and/or the automatic indexing control as will be hereinafter described.

Figure 2:
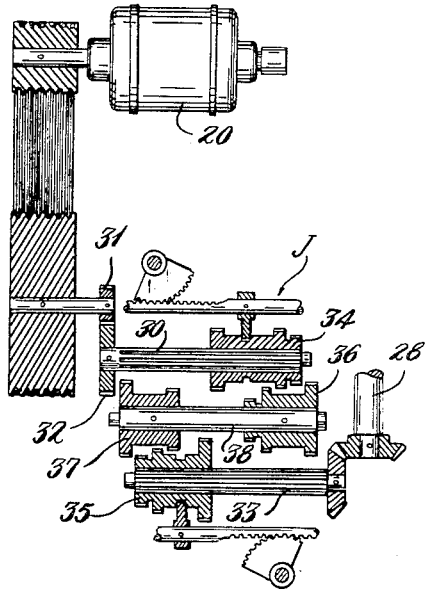
Fig. 2 is a diagrammatic view of that portion of the drive for the tool spindle which is located in the base of the machine.

The spindle 17 is adapted to be rotated at various rates of speed by the spindle drive motor 20 through the medium of speed change gearing, designated generally by the reference character J, see Fig. 2, housed in a suitable gear box supported in the bed of the machine; a vertical shaft 28, the lower end of which is rotatably supported in the gear box while the upper end is supported in the head column B; and back gears, designated generally by the reference character K located in the spindle head C. The motor 20 is connected to the driven shaft 30 of the speed change transmission J by a V-belt drive and spur gears 31 and 32, the former of which is fixed to a shaft carrying the driven pulley of the V-belt drive while the latter is fixed to the shaft 30. The driving shaft 33 of the transmission J is connected to the lower end of the vertical shaft 28 by miter gears. The speed change transmission J provides nine different speeds and comprises gear clusters 34 and 35 slidably supported on the shafts 30 and 33, respectively, and adapted to cooperate with gear clusters 36 and 37 fixed to an intermediate shaft 38.

The gear clusters 34 and 35 are adapted to be shifted lengthwise of the shafts 30 and 33 upon which they are slidably splined to obtain the various speeds by any suitable mechanism. The particular mechanism employed forms no part of the present invention per se and is not illustrated and described herein in detail.

The driven shaft 40 of the back gears K is rotatably supported in the spindle head and is connected to the upper end of the vertical shaft 28 by a bevel gear 41 carried by the spindle head and splined to the shaft 28. The bevel gear 41 meshes with a bevel gear 42 fixed to the left-hand end of the shaft 40. The spindle 17 is slidably keyed within a spindle quill 43 rotatably supported by suitable bearings in the spindle head C, which spindle quill has a gear cluster comprising the gears 44 and 45 fixed thereto. The gears 44 and 45 are adapted to be selectively engaged by gears 46 and 47, respectively, of a gear cluster splined to the shaft 40. A high speed drive is obtainable through the medium of a V-belt final drive 48 when the gear 47 is shifted into engagement with a gear 50 fixed to a short shaft 51 jounaled in the spindle head, which shaft carries the driving pulley of the V-belt drive 48. The gear cluster comprising the gears 46 and 47 is adapted to be shifted along the shaft 40 by a hand lever 52 fixed to the front end of a horizontal shaft journaled in the spindle head, the rear end of which shaft carries a yoke member engageable with the gear cluster.

The spindle 17 is adapted to be fed or rapid traversed in either direction by a lead screw 53 rotatably supported in the spindle head extension and having threaded engagement with a two-piece nut 54 located within the feed slide 55 adjacent to the left-hand end of the spindle 17 and connected thereto in a suitable manner. The lead screw 53 is adapted to be rotated in either direction and at different speeds from the spindle quill 43 through the medium of spur gears 56 and 57, the former of which is fixed to the left-hand end of the spindle quill while the latter is fixed to the right-hand end of a shaft 58 journaled in the spindle head and which forms the driving shaft of a feed speed change transmission, designated generally by the reference character L, housed within a suitable gear box in the spindle head. The gear 60 which forms the driving element of the feed change transmission L is operatively connected to a horizontal shaft 61 journaled in the spindle head through the medium of a gear 62 fixed to the left-hand end of the shaft 61.

The shaft 61 is adapted to be operatively connected to a horizontal shaft 63 journaled in the spindle head and extending substantially the length thereof through the medium of gears 64 and 65 of a gear cluster fixed to the shaft 61. The gear 64 is in mesh with a gear 66 journaled on the shaft 63 and the gear 65 with a gear 67 which in turn meshes with a gear 68 also journaled on the shaft 63. The gear 67 is journaled on a jack shaft 70 and the gear 68 rotates in a direction opposite to the rotation of the gear 66. The gears 66 and 68 are adapted to be selectively connected to the shaft 63 by a shiftable clutch element 71 splined on the shaft 63 between the gears 66 and 68, opposite ends of which clutch element are provided with clutch teeth adapted to cooperate with similar clutch teeth formed on the adjacent sides of the hub of the gears. The clutch element 71 is normally maintained in an intermediate or neutral position by a pair of springs 72 and 73 but is adapted to be shifted towards the left to drive the shaft 63 from the gear 66 or towards the right to connect the gear 68 with the shaft 63 by electric solenoids 74 and 75, respectively.

The armature of the solenoid 74 is connected to a slidable member 76 provided with an inclined cam slot 77 within which a roller carried by a longitudinally slidable rod 78 engages. The armature of the solenoid 75 is connected to the bar 78 in a manner similar to that in which the armature of the solenoid 74 is connected thereto, except for the fact that the cam slot 80 in the member 81 corresponding to the member 76 is inclined in the opposite direction to the slot 77. The lower ends of the cam slots are widened so that the operation of one of the members 76 and 81 will not be interfered with by the other. The slidable member 78 has a clutch yoke fixed to the right-hand end thereof which engages in a groove formed in the shiftable clutch member 71. The bar 78 is normally held in such a position that the clutch element 71 is in neutral position by the springs 72 and 73 which are located in a cut-out portion of the bar and engage opposite sides of a stationary stop fixed to the frame of the machine.

The left-hand end of the shaft 63 is connected to a gear 82 journaled thereon through the medium of an automatic release overload clutch 83. The gear 82 constitutes the driving gear of change gears, designated generally by the reference character M, the driven gear 84 of which is fixed to the end of the lead screw 53. Adjacent to its right-hand end, the shaft 63 is operatively connected to a spindle feed hand wheel 85, a crank 86 and fixed and adjustable dials, etc., as is known in the art. The mechanism shown per se forms no part of the present invention.

The spindle 17 is adapted to be moved at a rapid rate in either direction by the reversible spindle rapid traverse motor 23 which is continuously connected to the shaft 63 by gears 90 and 91, shaft 92, and bevel gears 93, 94, the latter of which is fixed to the shaft 63.

The reversible feed motor 22 is operatively connected to a horizontally extending shaft 100 rotatably supported in the base A, through the medium of a V-belt drive 101 and spur gears 102 and 103. From the gear 103 the drive is either at a relatively slow or feeding rate through a variable feed change transmission, designated generally by the reference character N, and an overrunning clutch device, designated generally by the reference character O, or at a relatively high or rapid rate through a normally disengaged disk clutch P, a shaft 104, and the overrunning clutch mechanism O. The feed change gears, etc., are housed within a suitable gear box in the base A. Through the medium of the transmission N, the shaft 100 may be rotated at various speeds, and through the medium of the normally disengaged friction clutch P, the driven element of which is carried by a gear 105 continuously in mesh with the gear 103, the shaft 100 may be selectively rotated at a high rate of speed. The gear 103 is keyed to the driven shaft of the feed change transmission N and the gear 105 is journaled on the shaft 104. The driving element of the friction clutch P is splined to the shaft 104, which shaft is in axial alignment with the shaft 100, and is adapted to be actuated to engage the clutch P upon energization of an electrically-operated solenoid 106 connected to one arm of a bell crank lever 107 pivoted on the frame, the other arm of which is connected to a member 108 which in turn actuates the clutch elements.

The last or driving gear 110 of the transmission N is continuously in mesh with a gear 111 which forms the low speed element of the overrunning clutch mechanism O. The gear 111 is rotatably supported on the shaft 100 and has formed integral therewith the driving element 112 of a normally engaged toothed clutch, the driven element 113 of which is splined on the shaft 100. The left-hand end of the driven element 113, as viewed in Fig. 4, has a plurality of sloping teeth or cam surfaces 114 which cooperate with similar teeth 115 on a high speed driving member 116 fixed to the right-hand end of the high speed shaft 104. The member 113 is continuously urged towards the left, as viewed in Fig. 4, by a compression spring 117 interposed therebetween and the gear 111. The construction is such that the shaft 100 is normally connected to the transmission N through the normally engaged clutch elements 112 and 113 and the gears 110 and 111, with the shaft 104 rotating at the same speed as the shaft 100 due to the engagement of the teeth 114 and 115.

Upon engagement of the friction clutch P, the shaft 104 is rotated at a higher rate of speed than the shaft 100. This difference in speed causes the teeth 114 of the slidable clutch element 113 to climb the teeth 115 of the element 116 carried by the shaft 104, with the result that the slidable clutch element 113 is moved towards the right, disengaging the teeth thereof from the teeth of the clutch element 112, which is turn disengages the low speed drive. Thereafter, the shaft 100 rotates at the same high speed as the shaft 104. Movement of the member 113 towards the right is limited by the compression spring 117, and the construction is such that the cooperating teeth 114 and 115 are never permitted to clear each other. Both sides of the teeth 114 and 115 are inclined which makes the device operable for either direction of rotation of the motor 22. When the clutch P is released, the spring 117 reengages the cooperating clutch teeth of the clutch elements 112 and 113, and reconnects the feed to the shaft 100 in place of the rapid traverse.

The shaft 100 is adapted to be operatively connected to a horizontal shaft 120 journaled in the base A of the machine and extending substantially the length thereof through the medium of gears 121, 122 of a gear cluster fixed to the shaft 100. The gear 121 is in mesh with a gear 123 and the gear 122 with a gear 124, which latter gear is in turn in mesh with a gear 125. The gear 124 is journeled on a jackshaft 126 and the gear 125 rotates in a direction opposite to the direction of rotation of the gear 123. The gears 123 and 125 are supported coaxially with the shaft 120 being keyed to driven elements of at double friction clutch S of commercial construction.

The particular clutch shown is a "Maxitorq" floating disk, self-locking, double clutch sold by The Carlyle Johnson Machine Company, Manchester, Connecticut, and is shown in Sweet's File for Product Designers for 1944 and is not herein shown and described in detail. Suffice it to say that it comprises a shiftable sleeve member 127 which when shifted to the right causes the shaft 120 to be driven by the gear 123 and when shifted to the left causes the shaft 120 to be driven by the gear 125. The clutch element 127 is provided with a groove within which an operating arm or yoke 128 engages. The arm 128 is fixed to the left-hand end of a slidable bar 130 which is normally maintained in position to hold the clutch element 127 in neutral by compression springs located in a cut-out portion of the bar 130 and abutting against opposite sides of the stationary stop 131 fixed to the frame of the machine.

The bar 130 is adapted to be shifted towards the right to connect the gear 123 to the shaft 120 by an electric solenoid 133 and toward the left to connect the gear 125 to the shaft 120 by an electric solenoid 134. The armature of the solenoid 133 is connected to a slidable member 135 provided with an inclined cam slot 136 within which a roller carried by the slidable bar 130 engages. The armature of the solenoid 134 is connected to the slidable bar 130 in a similar manner except for the fact that the cam slot 137 in the member 138 coresponding to the member 135 is inclined in the opposite direction to the slot 136. The upper ends of the cam slots 136, 137 are widened so that the operation of one of the members 135, 138 will not be interfered with by the other. Opposite ends of the shaft 120 are operatively connected to the lead screws 16, 18 which raise and lower the spindle head and backrest block, respectively, by miter gears 140 and 141, 142 and 143, respectively. The gear 140 is fixed to the left-hand end of the shaft 120 and is continuously in mesh with the gear 141 which is keyed to the lower end of the lead screw 16. The gear 141 is also engaged by a gear 144 fixed to the rear end of a shaft 145 projecting to the front of the machine where it is arranged for the reception of a hand crank, thus providing for manual raising and lowering of the spindle head and backrest column block. The gear 142 is splined to the shaft 120 so as to permit movement of the backrest column D toward and from the spindle head column B.

The table F is reciprocated upon the ways 14 and 15 by a lead screw 150 rotatably supported in the saddle E and in engagement with a cooperating nut fixed to the underside of the table. The lead screw 150 is adapted to be selectively connected to and driven by a splined shaft 151 rotatably supported in and extending lengthwise of the bed A. The shaft 151 is continuously connected to and driven by the shaft 100 through gears Q. A shaft 152 is rotatably supported in the saddle E and connected to the shaft 151 by gears R, the driven gear of which is splined to the shaft 151 so as to permit movement of the saddle E lengthwise of the bed along the ways 12. The lead screw 150 which moves the table is adapted to be selectively connected to the shaft 152 in a manner similar to that in which the shaft 120 is connected to the shaft 100. Suffice it to say that the duplicate parts are designated by the same reference characters with a prime mark affixed thereto.

The saddle E is moved along the ways 12 by a lead screw 153 supported in and extending lengthwise of the bed A and in engagement with a cooperating nut carried by the saddle E. The lead screw 153 is connected to the shaft 100 in a manner similar to that in which the shaft 120, which raises and lowers the spindle head C is connected to the shaft 100 and will not be described in detail. Suffice it to say that the duplicate parts are designated by the same reference characters with a double prime mark affixed thereto.

In operation, after the desired spindle speeds and the desired feed rates have been selected by the speed change transmission J and the feed change transmissions L and N, the remaining operations of the machine are controlled from the electrical control station H and/or the automatic repeat or indexing control. The feed push buttons for the spindle head C, saddle E and table F are arranged in groups and are arranged to give directional control. Each group has two "continuous" feed push buttons and two "inch" feed push buttons. The two "continuous" feed push buttons in each group are provided with electric light bulbs therein which illuminate the push buttons when they are momentarily depressed and remain lighted so long as the feed actuated thereby is in operation. This indicates at a glance to the operator which unit is being fed and in which direction. The controls are preferably so interlocked that the spindle head, saddle or table cannot be fed continuously unless the spindle 17 is rotating.

Figure 5:
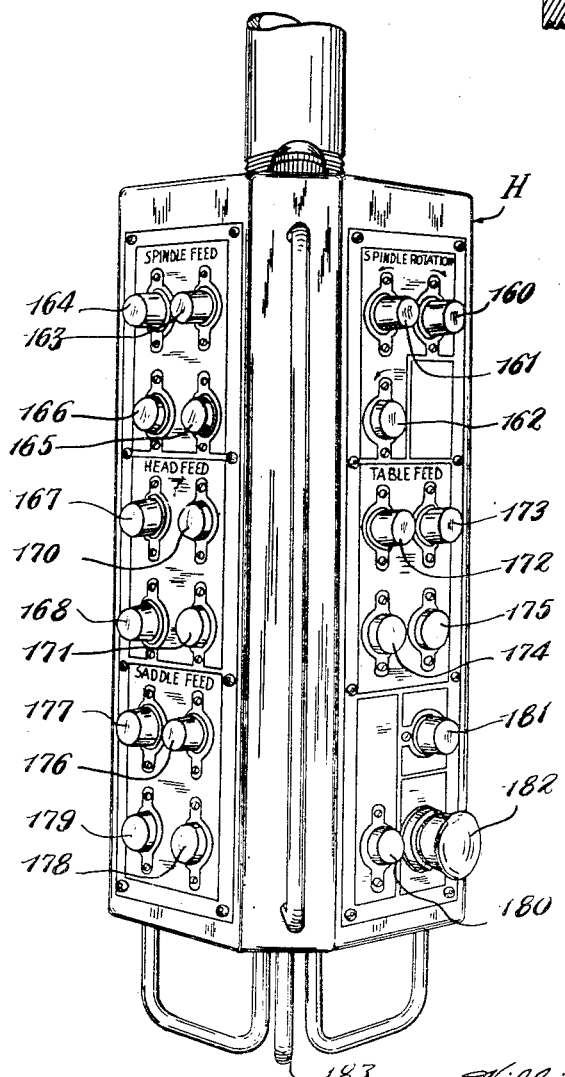
Fig. 5 is an enlarged, perspective view of the pendant control station.

Rotation of the spindle 17 is controlled by three push button switches 160, 161 and 162. The two upper push button switches 160, 161 cause the spindle to rotate continuously in opposite directions upon being instantaneously depressed. The right-hand push button 160, see Fig. 5, initiates continuous rotation of the spindle in a clockwise direction while the left-hand push button switch 161 initiates continuous rotation of the spindle in the opposite or counterclockwise direction. The lower jog push button switch 162 rotates the spindle in a counterclockwise direction so long as the push button is depressed. The spindle is adapted to be fed continuously toward the right by momentarily depressing the spindle continuous feed push button switch 163 and toward the left by momentarily depressing the spindle continuous feed push button switch 164. The spindle is moved at a rapid traverse rate toward the right or left upon either the spindle rapid right or spindle rapid left push button switches 165, 166 being depressed. The movement continues only as long as the push button switches are held depressed.

The spindle head continuous feed and jog feed push button switches are designated by the reference characters 167, 168, 170, 171. Instantaneous actuation of the head continuous feed up push button switch 167 initiates continuous feed movement of the spindle head in an upward direction and actuation of the head continuous feed down push button switch 168 initiates movement of the spindle head in the opposite direction. The head jog push button switches 170, 171 cause "inch" feed movement of the spindle head up and down, respectively. The table continuous feed and jog feed forward and back push button switches are designated by the reference characters 172, 173 and 174, 175, respectively. Instantaenous actuation of the table continuous feed forward push button switch 172 initiates continuous feed movement of the table toward the front and actuation of the table continuous feed back push button switch 173 initiates movement of the table toward the back of the machine. The push button switches 174, 175 cause "inch" feed movement of the table forward and back, respectively. The saddle continuous feed and jog push button switches are designated by the reference characters 176, 177 and 178, 179, respectively. Instantaneous actuation of the saddle continuous feed right push button switch 176 initiates continuous feed movement of the saddle toward the right and actuation of the saddle continuous feed left push button switch 177 initiates continuous feed movement of the saddle toward the left. The push button switches 178, 179 cause "inch" feed movement of the saddle toward the right and left, respectively. Rapid movement of the spindle head, saddle and table is controlled by a push button switch 180. When the push button switch 180 is depressed, any or all of the feed movements of the spindle head, saddle or table operating at that time are continued but at a rapid traverse rate so long as the push button switch 180 is held depressed. In addition to the push button switches mentioned above, the pendant control station H comprises a start feed motor push button switch 181 for the feed motor 22, a stop all feeds push button switch 182 and a stop all switch 183. The latter switch stops all operations of the machine.

As previously stated, one of the objects of the invention is the provision of a novel and improved machine tool including power actuated, automatic mechanism for sequentially indexing or positioning a movable machine tool element in or to a plurality of positions automatically and to an accuracy of a fraction of a thousandth of an inch, and which mechanism will accurately repeat a predetermined cycle, if desired.

Figure 7:
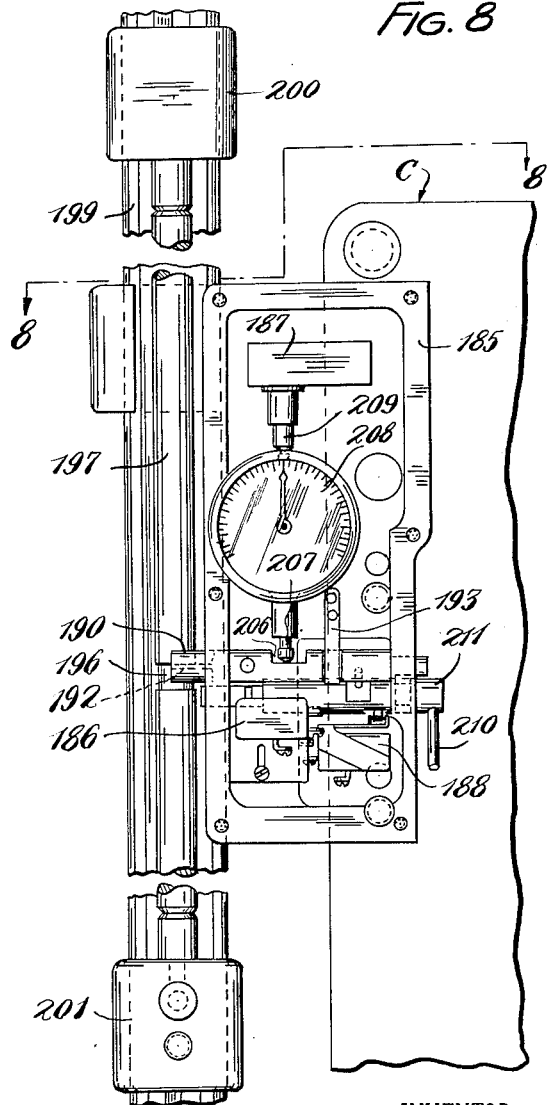
Fig. 7 is an enlarged, front elevational view with the cover of the control box removed, showing part of the indexing or positioning mechanism.
Figure 6:
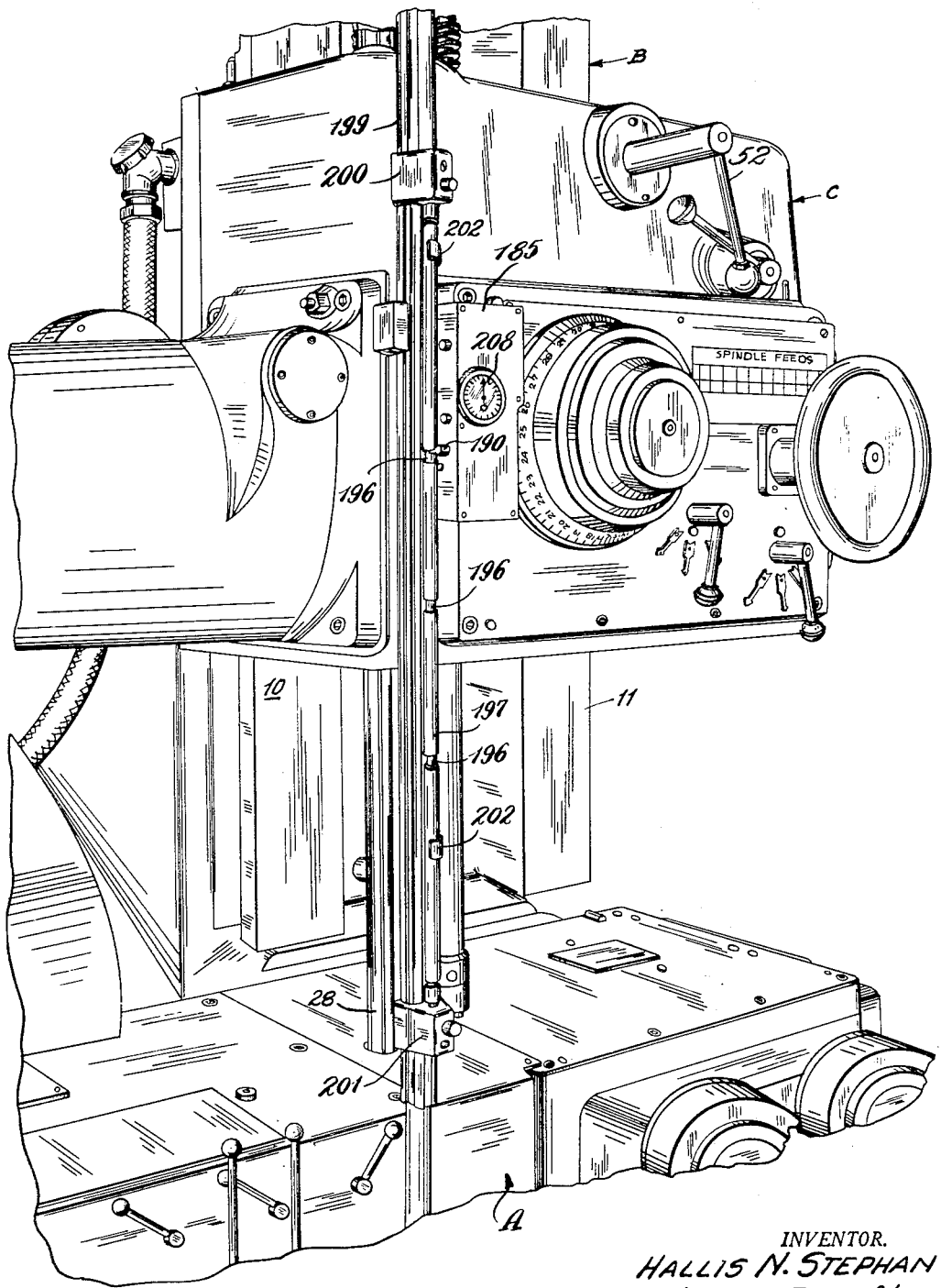
Fig. 6 is an enlarged, fragmentary, perspective view showing part of the indexing or positioning mechanism.

Referring particularly to Figs. 7 to 15, the so-called repeat position control mechanism includes a control box or housing 185 fixed to the spindle head C and housing three electrical micro switches 186, 187, 188 connected in the control circuit for the feed motor 22 and the clutch S which clutch, as previously described, controls the drive that effects the vertical movement of the spindle head. Actuation of the switches 186, 187, 188 is under the control of a generally cylindrical control member 190 rotatably supported in the housing 185 and projecting from opposite sides thereof. The left-hand projecting end of the member 190, as viewed in Fig. 7, is relieved as at 191 to provide a gauging ridge or finger 192. A leaf spring 193, the upper end of which is fixed to the housing 185 and the lower free end of which engages a normally vertical surface 194 on the member 190 formed by milling or otherwise producing a groove 195 therein, yieldably urges the control member 190 and the gauging finger 192 into the position shown in Figs. 7, 9 and 10. Attention is called to the fact that when the gauging finger 192 is in the position shown in Figs. 7, 9 and 10, it extends into a groove 196 in a repeat position control rod 197 detachably connected to the frame or stationary part of the machine. The control rod 197, as shown, is detachably supported in a shallow, V-shaped groove 198 formed in the front side of a vertically extending, stationary splined shaft 199, being located between upper and lower stops or anvils 200, 201 adjustably fixed to the shaft 199. Spring clips 202 located adjacent to opposite ends of the control rod and engaging thereabout and the shaft 199 hold the control rod in position on the shaft.

The control rod 197 has a plurality of grooves 196, one for each position into which it is desired to index the spindle head C for any given job set-up. The upper surfaces 203 of the grooves 196 are predetermined distances apart and form the gauge surfaces with which the gauge finger 192 coacts to stop the spindle head C in the desired position. The control rods are interchangeable and different control rods are used for different job set-ups.

In the machine shown, indexing is always effected with the spindle head C approaching the index position while moving in a downward direction. Under these conditions, the gauge finger 192 rides along the surface of the control rod 197 and holds the control member 190 in the position shown in dot-dash lines in Fig. 9 and in full lines in Fig. 12 until it reaches one of the control grooves 196. When the gauge finger 192 drops into one of the control grooves 196 in the control rod 197, the control member 190 is rotated by the spring 193 into the position shown in Figs. 7, 9 and 10. When the control member 190 is in the position shown in Fig. 12, the micro switch 186 is held closed by a pin 204 projecting from the control member 190. When the control member 190 is in any other position, the switch 186 is open. In a similar manner, the opening and closing of the switch 187 is adapted to be controlled by the position of the control member 190. To this end, the control member 190 has a relatively wide, flat surface 205 on its upper side, as viewed in Figs. 10 and 11, formed by the bottom of a transversely extending groove 206. The front edge of the surface 205 is engaged by the lower end of a through plunger 207 of a commercial dial indicator 208, the upper end of which plunger engages the actuator 209 of the micro switch 187. The construction is such that when the gauging finger 192 is in either of the positions shown in Figs. 11 and 12, the switch 187 is open but when rotated in a counterclockwise direction, as viewed in either of these figures, from the position shown in Fig. 11, as will be hereinafter described, the plunger 207 is raised to open the switch 187.

Figure 9:
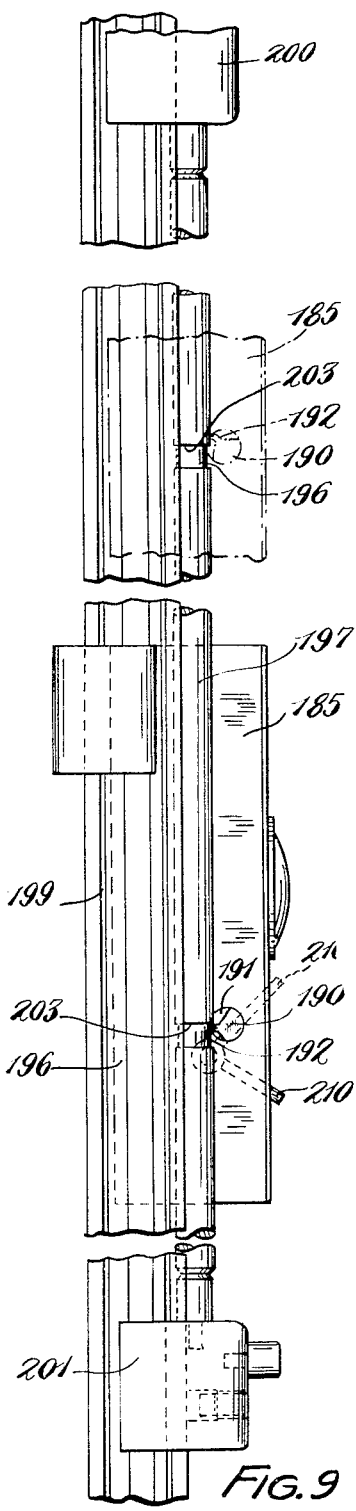
Fig. 9 is a fragmentary, side elevational view of the mechanism shown in Fig. 7 looking from the left.
Figure 8:
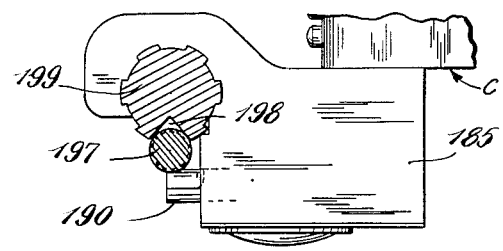
Fig. 8 is a sectional view approximately on the line 8—8 of Fig. 7.

When it is desired to manually control the positioning of the spindle head C or to prevent the gauge finger from operating as the spindle head C is being returned to its up position with the control rod 197 in position, the control member 190 can be manually shifted to an inoperative position; that is, to a position where the gauge finger clears the control rod 197 by rotating a lever 210 at the right of the control box 185 from the down position shown in Figs. 7 and 9 to the up position shown in dot-dash lines in Fig. 9. The lever 210 is fixed to the right-hand projecting end of a member 211 rotatably supported in the housing 185 below and slightly to the rear of the control member 190, see Fig. 11. The member is adapted to be retained in the housing 185 and held in any position to which it is adjusted by a compression spring 212 located on the left-hand reduced end of the member 211 and interposed between a shoulder 213 formed by a bore in the housing 185 within which the spring is positioned and a washer 214 fixed to the left-hand end of the member 211. A semi-circular stop block 215 located in a groove 216 in the member 211 and held against axial movement by a screw 217 cooperates with a pin 218 carried by the member 211 to limit rotation of the member.

The member 211 is operatively connected to the control member 190 by a lost motion connection so as not to interfere with its normal operation. This connection comprises a pin 225 fixed to the member 190 and projecting in a groove 226 in the member 211. With the lever 210 in its down position the control member 190 is free to rotate insofar as the member 211 is concerned as the pin 225 can move freely in the groove 226. As the lever 210 is rotated to its up position, rotation of the member 211 causes the bottom surface 227 of the groove 226 to engage the left-hand side of the lower end of the lever 225, as viewed in Fig. 14, and rotate the control member 190 to a position in which the gauge finger 192 is clear of the control rod 197. The control member 190 is held in this position by the member 211 until the lever 210 is returned to its lower position.

The switch 188 is provided with an operating arm 230 having a roller 231 at its free end which roller is adapted to engage and roll upon the circumference of the member 211 and engage a flat surface 232 formed by a groove 233 in the bottom of the member 211 when the member is in the position shown in Fig. 14. The switch 188 is normally closed but when the member 211 is rotated to a position to make the control member 190 inoperative, the roller 231 rolls up upon the circumference of the member 211 and opens the switch 188.

Duplicate mechanisms are employed to control the operation of the table F. These mechanisms will not be described in detail. Suffice it to say that the corresponding parts are designated by the same reference characters with a prime mark affixed thereto and that the control housing 185' is fixed to the saddle E and that the control rods 197' are moved relative thereto upon movement of the table F since they are detachably secured in a trough extending along the operator's side of the table. While similar mechanisms are not employed in the machine shown for controlling the movements of the saddle E, it is to be understood that such may be employed, if desired.

*Manual operation*

Figure 18:
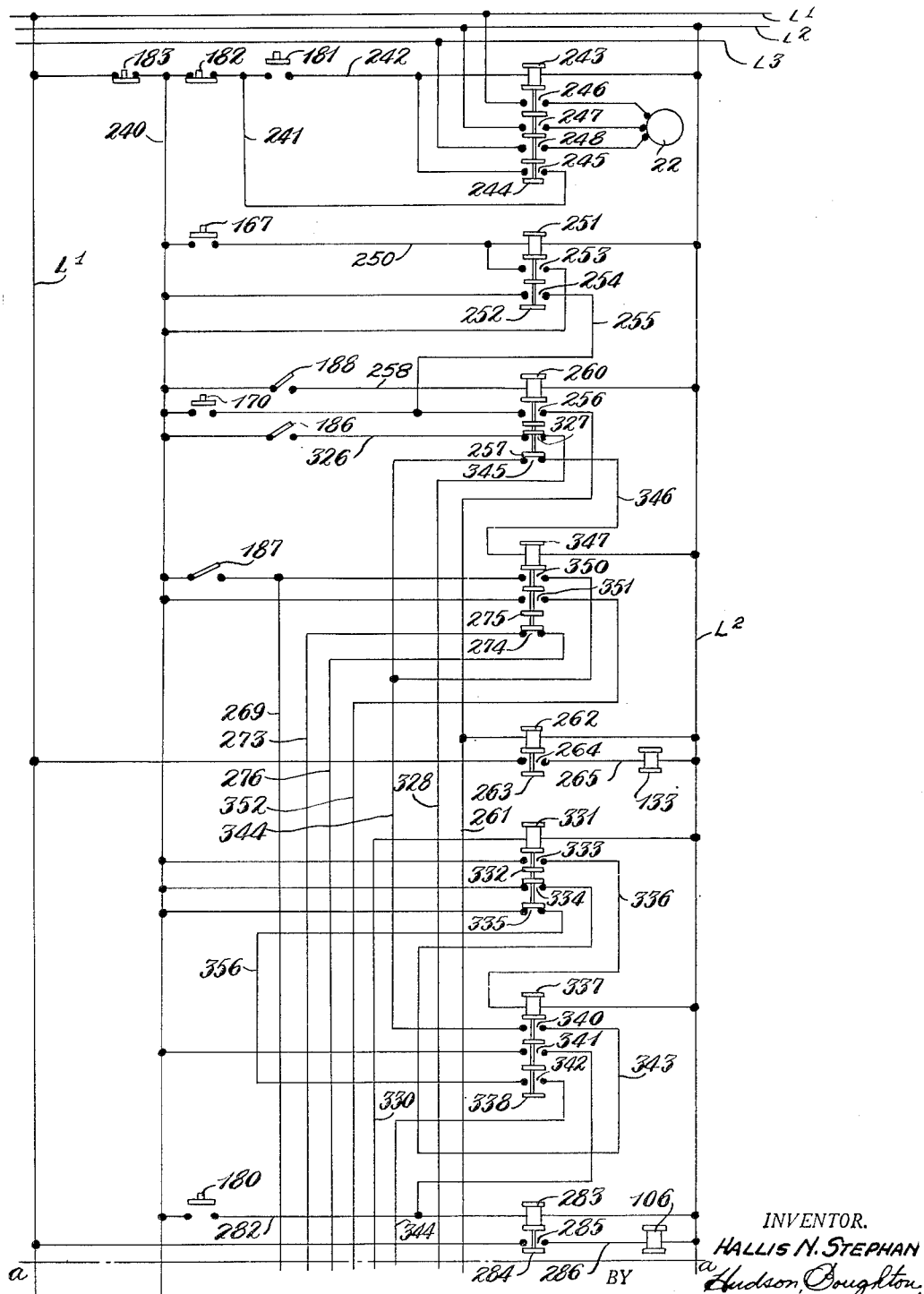

The operation of the machine will now be described with reference to the wiring diagram, Figs. 18 and 19. Since the particular manner of controlling the rotation of the spindle and the feed and rapid traverse movements of the spindle within the spindle head form no part of the present invention, these parts of the control for the machine are not herein illustrated and described. Suffice it to say that the various operations previously referred to can be effected by pressing the proper push button switches 160 to 166 and that the continuous movements, once initiated, can be stopped by pushing one or the other of the stop push button switches 182, 183 as the circumstances require.

The feed motor 22 which supplies the power for feeding the spindle head C, saddle E and table F in the desired direction, commonly referred to as the milling feeds, normally operates continuously in the same direction and is started by momentarily depressing the start feed motor push button switch 181. This establishes a circuit from the line L–1 through the stop all push button switch 183, wire 240, stop all feeds push button switch 182, wire 241, start feed motor push button switch 181, wire 242, operating solenoid 243 of feed forward contactor 244 to L–2. Energization of the operating solenoid 243 of the feed forward contactor 244 closes the normally open contacts 245, 246, 247, 248 thereof. The closing of normally open contacts 245 establishes a holding circuit for the operating solenoid 243 after the start feed motor push button switch 181 is released. The closing of normally open contacts 246, 247, 248 of feed forward contactor 244 connects the motor to the power lines L–1, L–2 and L–3 and the motor thereafter rotates in the forward direction until either the stop all feeds push button switch 182 or stop all push button switch 183 is depressed or one of the over-travel limit switches, etc., not shown, is opened.

With the feed motor 22 operating, the pairs of gears 123, 125 and 123', 125' and 123", 125" rotatably supported on shaft 120 and the screws 150, 153, respectively, are driven with the gears of each pair rotating in opposite directions. As previously explained, these gears are adapted to be selectively connected to the shaft upon which they are supported and, in turn, feed the machine tool element moved thereby in the desired direction by the shiftable clutch elements 127, 127' and 127" under the control of the clutch operating solenoids 133, 134 and 133', 134' and 133", 134", respectively, the energization and deenergization of which solenoids are controlled from the pendant control station H and the repeat control mechanism.

Referring first to the control as it is effected from the pendant control station H as distinguished from the automatic indexing or repeat control mechanism, which will be referred to later, the spindle head C is caused to feed "up" continuously by momentarily depressing the head continuous feed up push button switch 167, closing the normally open contacts thereof. This establishes a circuit from the line L–1 through the stop all push button switch 183, wire 240, normally open contacts of head continuous feed up push button switch 167, which contacts are now closed, wire 250, operating solenoid 251 of head feed up control relay 252 to line L–2 actuating relay 252, closing its normally open contacts 253, 254. The closing of normally open contacts 253 establishes a holding circuit for the head continuous feed up control relay 252 from the wire 240 to the wire 250. The closing of the normally open contacts 254 of relay 252 establishes a circuit from the wire 240 through the contacts 254, which are now closed, wire 255, normally open contacts 256 of relay 257, which contacts are now closed, because switch 188 controlled by the member 211 is now closed, establishing a circuit from the line 240 through switch 188, wire 258, operating solenoid 260 of relay 257 to line L–2. From the contacts 256 the circuit continues by wire 261, operating solenoid 262 of head feed up relay 263 to the line L–2. Actuation of head feed up relay 263 closes the normally open contacts 264 thereof establishing a circuit from the line L–1 through normally open contacts 264, which are now closed, wire 265, and the head feed up solenoid 133 to line L–2.

Energization of the head feed up solenoid 133 shifts the clutch element 127 into engagement with the clutch element on the hub of the gear 123 causing the shaft 120 to be rotated in a direction to raise the spindle head C at a feed rate. The head continues to feed up until the holding circuit for head feed up control relay 252 is broken by the operator depressing the stop all push button switch 183 or upon the opening of an interlock or an over-travel limit switch, not shown. It is to be understood that suitable interlocks and over-travel limit switches are employed to prevent attempted actuation in two directions at one time, etc. as is customary in machines of this character. These controls, however, are omitted from the wiring diagram, etc. for purposes of simplicity.

The spindle head C is caused to feed down continuously by momentarily depressing the head continuous feed down push button switch 168 closing the normally open contacts thereof. This establishes a circuit from the line L–1 through the stop all push button switch 183, wire 240, normally open contacts of head continuous feed down push button switch 168, which contacts are now closed, wire 266, operating solenoid 267 of head feed down control relay 268 to line L–2, actuating relay 268, closing its normally open contacts 270, 271, 272. The closing of normally open contacts 270 establishes a holding circuit for the head continuous feed down control relay 268 from the wire 240 to the wire 266 through the normally closed switch 187 and the wire 269. The closing of normally open contacts 271 of relay 268 establishes a circuit from the wire 240 through the contacts 271, which are now closed, wire 273, normally closed contacts 274 of relay 275 which is now deenergized, wire 276, operating solenoid 277 of head feed down relay 278 to the line L–2. Actuation of head feed down relay 278 closes the normally open contacts 280 thereof establishing a circuit from the line L–1 through normally open contacts 280, which are now closed, wire 281, and the head feed down solenoid 134 to L–2. Energization of the head feed down solenoid 134 shifts the clutch element 127 into engagement with the clutch element on the hub of the gear 125 causing the shaft 120 to be rotated in a direction to lower the spindle head C at a feed rate. The head continues to feed down until the holding circuit for head feed down control relay 268 is broken by the operator depressing the stop all push button switch 183 or upon the actuation of an interlock, etc. not shown.

With the continuous feed operating in either direction, the movement of the spindle head can be continued in whichever direction it is operating but at a rapid traverse rate by the operator depressing the rapid movement push button switch 180 to close the normally open contacts thereof. This establishes a circuit from the line L–1 through the stop all push button switch 183, wire 240, normally open contacts of rapid movement push button switch 180, which are now closed, wire 282, operating solenoid 283 of rapid movement relay 284 to L–2 causing the relay to operate and close its normally open contacts 285. This establishes a circuit from the line L–1 through normally open contacts 285, which are now closed, wire 286, and operating solenoid 106 for clutch P to L–2 energizing operating solenoid 106 engaging the clutch P, causing operation of the high speed shaft 104 which drives the shaft 100 and in turn the lead screw 16 at a rapid traverse rate in a manner previously described.

The spindle head C may be jog fed in an upward direction by depressing the head jog feed up push button switch 170 to close the normally open contacts thereof, which contacts are in parallel circuit with the normally open contacts 254 of head continuous feed up control relay 252. When push button switch 170 is depressed to close its contacts, a circuit is established from the wire 240 through the normally open contacts of head jog feed up push button switch 170, wire 255, normally open contacts 256 of relay 257, which contacts are now closed, because switch 188 controlled by the member 211 is now closed, establishing a circuit from the line 240 through switch 188, wire 258, operating solenoid 260 of relay 257 to line L–2. From the contacts 256 the circuit continues by wire 261, and operating solenoid 262 of head feed up relay 263 to line L–2. The actuation of head feed up relay 263 closes the normally open contacts 264 energizing the head feed up solenoid 133 in a manner previously described, thus shifting the clutch element 127 into engagement with the clutch element on the hub of the gear 123 causing the shaft 120 to rotate and the head C to feed in an upward direction. The up movement of the head continues so long as the head jog feed up push button switch 170 is held depressed.

The spindle head C may be jog fed in a down direction by depressing the head jog feed down push button switch 171 to close the normally open contacts thereof, which contacts are in parallel circuit with the normally open contacts 271 of head continuous feed down control relay 268. When push button switch 171 is depressed to close its contacts, a circuit is established from the wire 240 through the normally open contacts of head jog feed down push button switch 171, wire 273, normally open contacts 274 of relay 275, which contacts are now closed, wire 276, and operating solenoid 277 of head feed down relay 278 to L–2. The actuation of head feed down relay 278 closes the normally open contacts 280 energizing the head feed down solenoid 134 in a manner previously described, thus shifting the clutch element 127 into engagement with the clutch element on the hub of the gear 125 causing the shaft 120 to rotate and the head C to feed in a downward direction. The down movement of the head continues so long as the head jog feed down push button switch 171 is held depressed.

The table F is caused to feed "back" continuously by momentarily depressing the table continuous feed back push button switch 173, closing the normally open contacts thereof. This establishes a circuit from the line L–1 through the stop all push button switch 183, wire 240, normally open contacts of table continuous feed back push button switch 173, which contacts are now closed, wire 290, operating solenoid 291 of table feed back control relay 292 to line L–2 actuating relay 292, closing its normally open contacts 293, 294. The closing of normally open contacts 293 establishes a holding circuit for the table continuous feed back control relay 292 from the wire 240 to the wire 290. The closing of the normally open contacts 294 of relay 292 establishes a circuit from the wire 240 through the contacts 294, which are now closed, wire 295, normally open contacts 296 of relay 297, which contacts are now closed, because switch 188′ controlled by the member 211′ is now closed, establishing a circuit from the line 240 through switch 188′, wire 298, operating solenoid 300 of relay 297 to line L–2. From the contacts 296 the circuit continues by wire 301, operating solenoid 302 of table feed back relay 303 to the line L–2. Actuation of table feed back relay 303 closes the normally open contacts 304 thereof establishing a circuit from the line L–1 through normally open contacts 304, which are now closed, wire 305, and the table feed back solenoid 133′ to line L–2.

Energization of the table feed back solenoid 133′ shifts the clutch element 127′ into engagement with the clutch element on the hub of the gear 123′ causing the screw 150 to be rotated in a direction to move the table F toward the rear at a feed rate. The table continues to feed back until the holding circuit for table feed back control relay 292 is broken by the operator depressing the stop all push button switch 183 or upon the opening of an interlock or an over-travel limit switch omitted from the wiring diagram, etc. for purposes of simplicity.

The table F is caused to feed forwardly continuously by momentarily depressing the table continuous feed forward push button switch 172 closing the normally open contacts thereof. This establishes a circuit from the line L–1 through the stop all push button switch 183, wire 240, normally open contacts of table continuous feed forward push button switch 172, which contacts are now closed, wire 306, operating solenoid 307 of table feed forward control relay 308 to line L-2, actuating relay 308, closing its normally open contacts 310, 311, 312. The closing of normally open contacts 310 establishes a holding circuit for the table continuous feed forward control relay 308 from the wire 240 to the wire 306 through the normally closed switch 187' and the wire 313. The closing of normally open contacts 311 of relay 308 establishes a circuit from the wire 240 through the contacts 311, which are now closed, wire 314, normally closed contacts 315 of relay 316 which is now deenergized, wire 317, operating solenoid 318 of table feed forward relay 319 to the line L-2. Actuation of table feed forward relay 319 closes the normally open contacts 320 thereof establishing a circuit from the line L-1 through normally open contacts 320, which are now closed, wire 321, and the table feed forward solenoid 134' to L-2. Energization of the table feed forward solenoid 134' shifts the clutch element 127' into engagement with the clutch element on the hub of the gear 125' causing the screw 150 to be rotated in a direction to move the table F forward at a feed rate. The table continues to feed forward until the holding circuit for table feed forward control relay 308 is broken by the operator depressing the stop all push button switch 183 or upon the actuation of an interlock, etc. not shown.

With the continuous feed operating in either direction, the movement of the table head can be continued in whichever direction it is operating but at a rapid traverse rate by the operator depressing the rapid movement push button switch 180 to close the normally open contacts thereof. This establishes a circuit energizing operating solenoid 106 engaging the clutch P, causing operation of the high speed shaft 104 which drives the shaft 100 and in turn the lead screw 150 at a rapid traverse rate in a manner previously described.

The table F may be jog fed to the rear by depressing the table jog feed back push button switch 175 to close the normally open contacts thereof, which contacts are in parallel circuit with the normally open contacts 294 of table continuous feed back control relay 292. When push button switch 175 is depressed to close its contacts, a circuit is established from the wire 240 through the normally open contacts of table jog feed back push button switch 175, wire 295, normally open contacts 296 of relay 297, which contacts are now closed, because switch 188' controlled by the member 211' is now closed, establishing a circuit from the line 240 through switch 188', wire 298, operating solenoid 300 of relay 297 to line L-2. From the contacts 296 the circuit continues by wire 301, and operating solenoid 302 of table feed back relay 303 to line L-2. The actuation of table feed back relay 303 closes the normally open contacts 304 energizing the table feed back solenoid 133' in a manner previously described, thus shifting the clutch element 127' into engagement with the clutch element on the hub of the gear 123' causing the screw 150 to rotate and the table F to feed back. The back movement of the table continues so long as the table jog feed back push button switch 175 is held depressed.

The table F may be jog fed in a forward direction by depressing the table jog feed forward push button switch 174 to close the normally open contacts thereof, which contacts are in parallel circuit with the normally open contacts 311 of table continuous feed forward control relay 308. When push button switch 174 is depressed to close its contacts, a circuit is established from the wire 240 through the normally open contacts of table jog feed forward push button switch 174, wire 314, normally open contacts 315 of relay 316, which contacts are now closed, wire 317, and operating solenoid 318 of table feed forward relay 319 to L-2. The actuation of table feed forward relay 319 closes the normally open contacts 320 energizing the table feed forward solenoid 134' in a manner previously described, thus shifting the clutch element 127' into engagement with the clutch element on the hub of the gear 125' causing the screw 150 to rotate and the table F to feed in a forward direction. The forward movement of the table continues so long as the table jog feed forward push button switch 174 is held depressed.

*Repeat position control*

When it is desired to utilize the repeat position control features of the machine, the control levers 210, 210' are moved to their respective repeat control positions to open the switches 188, 188' and position the gauging fingers 192, 192' on the control members 190, 190' in operative position to engage the respective repeat position control rods 197, 197'; in other words, the repeat control levers 210, 210' are moved to a position corresponding with the full line position of the lever 210 shown in Figs. 6 to 14. The spindle head continuous feed up and jog up switches and the table continuous feed back and jog back switches 167, 170, 173, 175, respectively, are rendered inoperative and the operation of the machine is thereafter as follows, referring first to the movements of the spindle head C.

As previously stated, repeat positioning is always effected with the spindle head moving in a downward direction, with the spindle head starting in a position above the first position or station in which an operation of the tool is to be performed. Under these circumstances, the gauging finger 192 of the control member 190 is normally in engagement with a portion of the repeat position control member 197 above one of the control grooves 196 therein; that is, in a position similar to that shown in dot-dash lines in Fig. 9. With the control member 190 in the position referred to, the switch 186 is closed by the member 204. Downward movement of the spindle head C is initiated by momentarily depressing the head feed down continuous push button switch 168. This establishes a circuit from the line L-1 through the normally closed stop all push button switch 183, wire 240, normally open contacts of head continuous feed down push button switch 168, wire 266, operating solenoid 267 of head feed down control relay 268, to line L-2, actuating the relay and closing its normally open contacts 270, 271, 272. The closing of normally open contacts 270 establishes a holding circuit for the relay 268 from the wire 240 through normally closed switch 187, wire 269, normally open contacts 270 of relay 268 to the wire 266. The closing of the normally open contacts 271 of relay 268 establishes a circuit from the wire 240 through the contacts 271, wire 273, normally closed contacts 274 of relay 275, which relay is now deenergized, wire 276, operating solenoid 277 of head feed down relay 278 to line L-2. Actuation of the head feed down relay 278 closes the normally open contacts 280 thereof establishing a circuit from the line L-1 through normally open contacts 280, wire 281, and the head feed down solenoid 134 to L-2.

Energization of the head feed down solenoid 134 shifts the clutch element 127 into engagement with the clutch element on the hub of the gear 125 causing the shaft 120 to be rotated in a direction to lower the spindle head C at a feed rate. The actuation of relay 278 also closes its normally open contacts 325, establishing a circuit from the wire 240 through switch 186, which is now closed, as previously stated, wire 326, normally closed contacts 327 of relay 257, which is now deenergized, wire 328, contacts 325 of relay 278, which contacts are now closed, wire 330, operating solenoid 331 of relay 332 to L-2.

Energization of the operating solenoid 331 of relay 332 closes its normally open contacts 333 and opens its normally closed contacts 334, 335. The closing of the normally open contacts 333 of relay 332 establishes a circuit from the line 240 through contacts 333, wire 336, operating solenoid 337 of relay 338 to L-2, closing the normally open contacts 340, 341, 342 thereof. The closing of the normally open contacts 341 of relay 338 establishes a circuit from the wire 240 through contacts 341, wire 282, operating solenoid 283 of rapid traverse relay 284 to L-2, closing the normally open contacts 285 of rapid traverse relay 284 energizing the operating solenoid 106 of clutch P, causing the spindle head to continue to move in a downward direction but at a rapid traverse rate.

The spindle head C continues to move in a downward direction until the gauging finger 192 on the control member 190 drops into the first recess 196 in the repeat position control rod 197. When this occurs, the control assumes the position shown in Figs. 6-11, inclusive. The control member 190 rotates under the action of the spring 193 to the position referred to, allowing the switch 186 to open. The opening of the switch 186 breaks the circuit to operating solenoid 331 of relay 332 opening its normally open contacts 333 and closing its normally closed contacts 334, 335. The closing of the normally closed contacts 334 of relay 332, which closes before the normally open contacts 333 thereof open, establishes a circuit from the wire 240, through the contacts 334, wire 343, normally open contacts 340 of relay 338, which are now closed, wire 344, normally closed contacts 345 of relay 257, wire 346, operating solenoid 347 of relay 275 to L-2.

Energization of the operating solenoid 347 of relay 275 closes its normally open contacts 350, 351 and opens its normally closed contacts 274. The opening of the normally closed contacts 274 of relay 275 breaks the circuit for the solenoid 277 of head down relay 278 allowing its contacts 280 to open, deenergizing the operating solenoid 134 and returning the clutch S to neutral position, discontinuing further movement of the spindle head C in a downward direction. Due to the fact that the spindle head C is moving downward at a rapid traverse rate before it eventually comes to rest, the index finger 192 of the control member 190 will be an appreciable distance below the upper or gauging edge of the groove 196 within which it is located.

The closing of the normally open contacts 350 of relay 275 establishes a holding circuit for the operating solenoid 347 thereof from the wire 240 through switch 187, which is now closed, wire 269, contacts 350, wire 344, contacts 345, wire 346, operating solenoid 347 to L-2.

Subsequent to the closing of the normally closed contacts 334 of relay 332, the normally open contacts 333 thereof open, breaking the circuit for the operating solenoid 337 of relay 338, opening the normally open contacts 340, 341, 342 thereof. The opening of contacts 340 through which the circuit for the operating solenoid 347 of relay 275 is originally made does not affect this relay because of the holding circuit therefor, previously referred to, and established through the switch 187. The opening of contacts 341 of relay 338 breaks the circuit for the operating solenoid 283 of relay 284, deenergizing the operating solenoid 106 of clutch P, allowing the clutch to disengage and the shaft 100 to be thereafter driven through the change feed transmission N at the feed rate.

The closing of the normally open contacts 351 of relay 275 establishes a circuit from the wire 240 through contacts 351, wire 352, contacts 272 of relay 268, which relay is now energized, wire 261, operating solenoid 262 of spindle head up control relay 263, closing its normally open contacts 264 establishing a circuit from the wire L-1 through contacts 264, wire 265, operating solenoid 133 of clutch S to L-2. The energization of operating solenoid 133 of clutch S shifts the clutch element 127 into engagement with the clutch element on the hub of the gear 123 causing the shaft 120 and, in turn, the lead screw 16 to be rotated at a feed rate in a direction to raise the spindle head C. The spindle head continues to move in an upward direction at a feed rate until the holding circuit through switch 187 for the relay 275 is broken by the opening of the switch 187 under the action of the through plunger 207 of the dial indicator 208, which plunger has been moved upward by the engagement of its lower end with the surface 205 on the control member 190, which member is rocked in a counterclockwise direction as viewed in Figs. 9, 11 and 12 by the engagement of the gauge finger 192 with the downwardly facing gauge surface of the repeat control rod 197. When the holding circuit for the operating solenoid 347 of relay 275 is broken by the opening of switch 187, the normally open contacts 351 open, breaking the holding circuit for the operating solenoid 262 of spindle head up control relay 263, opening the normally open contacts 264 thereof, deenergizing the operating solenoid 133 of the clutch S, whereupon the clutch returns to neutral position and the spindle head stops in the position in which it is desired to move it.

After the boring or other operation is completed, the spindle head may be moved to the next index position by depressing the head continuous down push button switch 168 which establishes a circuit from the line L-1 through the stop all push button switch 183, wire 240, normally open contacts of head continuous down push button switch 168, which contacts are now closed, wire 266, operating solenoid 267 of relay 268 to L-2. Energization of the operating solenoid 267 of relay 268 closes the normally open contacts 270, 271, 272 thereof. The closing of the normally open contacts 270 establishes a holding circuit for the relay from the wire 240 through switch 187, which is now closed, wire 269, contacts 270 to wire 266. The closing of normally open contacts 271 of relay 268 establishes a circuit from the wire 240 through contacts 271, wire 273, normally closed contacts 274 of relay 275, which contacts are now closed, wire 276, operating solenoid 277 of relay 278 to L-2. Energization of the operating solenoid 277 of relay 278 closes the normally open contacts 280 thereof establishing a circuit from the line L-1 through contacts 280, which are now closed, wire 281, solenoid 134 of clutch S.

Energization of the operating solenoid 134 of clutch S shifts the clutch element 127 into engagement with the clutch element on the hub of the gear 125 causing the shaft 120 to rotate and the head to feed in a downward direction. This downward movement of the head continues until the switch 186 is closed by the gauge finger 192 riding up upon the surface of the control rod 197. When the switch 186 is closed, a circuit is established from the wire 240 through the switch 186, wire 326, normally closed contacts 327 of relay 257, which contacts are now closed, wire 328, contacts 325 of relay 278, wire 330, operating solenoid 331 of relay 332 to L-2. Actuation of relay 332 in turn actuates relay 338 in a manner previously described closing the normally open contacts 341 of the latter, establishing a circuit from the wire 240 through the contacts 341, wire 282, operating solenoid 283 of relay 284 to L-2. The closing of normally open contacts 285 of relay 284 establishes a circuit from the line L-1 through contacts 285, wire 286, operating solenoid 106 of clutch P to line L-2 causing the high speed shaft 104 and, in turn, the lead screw 16 to be operated at rapid traverse rate. The spindle head continues to move in a downward direction at rapid traverse rate until the gauge finger 192 drops into the next control groove 195 in the control rod 197 whereupon the operation of stopping the spindle head, previously described, is repeated.

Repeat positioning of the table F is always effected with the table moving in the forward direction, starting from a position in front of the first position or station in which an operation of the tool is to be performed. Under these circumstances, the gauging finger of the control member 190′ is normally in engagement with a portion of the repeat position control rod 197′ in front of the control grooves 196′ therein. With the control member 190′ in the position referred to, the switch 186′ is closed. Forward movement of the table F is initiated by momentarily depressing the table continuous feed forward push button switch 172. This establishes a circuit from the line L-1 through the normally closed stop all push button switch 183, wire 240, normally open contacts of table continuous feed forward push button switch 172, wire 306, operating solenoid 307 of table feed forward control relay 308 to line L-2, actuating the relay and closing its normally open contacts 310, 311, 312. The closing of normally open contacts 310 establishes a holding circuit for the relay 308 from the wire 240 through normally closed switch 187', wire 313, normally open contacts 310, relay 308 to the wire 306. The closing of the normally open contacts 311 of relay 308 establishes a circuit from the wire 240 through the contacts 311, wire 314, normally closed contacts 315 of relay 316, which relay is now deenergized, wire 317, operating solenoid 318 of table feed forward relay 319 to line L-2. Actuation of the table feed forward relay 319 closes the normally open contacts 320 thereof establishing a circuit from the line L-1 through normally open contacts 320, wire 321, and the table feed forward solenoid 134' to L-2.

Energization of the table feed forward solenoid 134' shifts the clutch element 127' into engagement with the clutch element on the hub of the gear 125' causing the screw 150 to be rotated in a direction to move the table forward at a feed rate. The actuation of relay 319 also closes its normally open contacts 353, establishing a circuit from the wire 240 through switch 186', which is now closed, as previously stated, wire 354, normally closed contacts 355 of relay 297, which is now deenergized, wire 328, contacts 353 of relay 319, which contacts are now closed, wire 330, operating solenoid 331 of relay 332 to L-2.

Energization of the operating solenoid 331 of relay 332 closes its normally open contacts 333 and opens its normally closed contacts 335. The closing of the normally open contacts 333 of relay 332 establishes a circuit from the wire 240 through contacts 333, wire 336, operating solenoid 337 of relay 338 to L-2, closing the normally open contacts 340, 341, 342 thereof. The closing of the normally open contacts 341 of relay 338 establishes a circuit from the wire 240 through contacts 341, wire 282, operating solenoid 283 of rapid traverse relay 284 to L-2, closing the normally open contacts 285 of rapid traverse relay 284 energizing the operating solenoid 106 of clutch P, causing the table to continue to move in a forward direction but at a rapid traverse rate.

The table F continues to move in a forward direction until the gauging finger on the control member 199' drops into the first recess 196' in the repeat position control rod 197'. When this occurs, the control member 190' rotates allowing the switch 186' to open. The opening of the switch 186' breaks the circuit to operating solenoid 331 of relay 332 opening its normally open contacts 333 and closing its normally closed contacts 335. The closing of the normally closed contacts 335 of relay 332, which closes before the normally open contacts 333 thereof open, establishes a circuit from the wire 240, through the contacts 335, wire 356, normally open contacts 342 of relay 338, which are now closed, wire 344, normally closed contacts 357 of relay 297, wire 358, operating solenoid 359 of relay 316 to L-2.

Energization of the operating solenoid 359 of relay 316 closes its normally open contacts 360, 361 and opens its normally closed contacts 315. The opening of the normally closed contacts 315 of relay 316 breaks the circuit for the solenoid 318 of table forward relay 319 allowing its contacts 320 to open, deenergizing the operating solenoid 134' and returning the clutch S' to neutral position, discontinuing further movement of the table F in a forward direction. Due to the fact that the table F is moving forward at a rapid traverse rate before it eventually comes to rest, the index finger of the control member 190' will be an appreciable distance behind the front or gauging edge of the groove 196' within which it is located.

The closing of the normally open contacts 360 of relay 316 establishes a holding circuit for the operating solenoid 359 thereof from the wire 240 through switch 187', which is now closed, wire 313, contacts 360, wire 344, contacts 357, wire 358, operating solenoid 359 to L-2.

Subsequent to the closing of the normally closed contacts 334 of relay 332, the normally open contacts 333 thereof open, breaking the circuit for the operating solenoid 337 of relay 338, opening the normally open contacts 340, 341, 342 thereof. The opening of contacts 342 through which the circuit for the operating solenoid 359 of relay 316 is originally made does not affect this relay because of the holding circuit therefor, previously referred to, and established through the switch 187'. The opening of contacts 341 of relay 338 breaks the circuit for the operating solenoid 283 of relay 284, deenergizing the operating solenoid 106 of clutch P, allowing the clutch to disengage and the shaft 100 to be thereafter driven through the change feed transmission N at the feed rate.

The closing of the normally open contacts 361 of relay 316 establishes a circuit from the wire 240 through contacts 361, wire 362, contacts 312 of relay 308, which relay is now energized, wire 301, operating solenoid 302 of table back control relay 303, closing its normally open contacts 304 establishing a circuit from the wire L-1 through contacts 304, wire 305, operating solenoid 133' of clutch S' to L-2. The energization of operating solenoid 133' of clutch S' shifts the clutch element 127' into engagement with the clutch element on the hub of the gear 123' causing the lead screw 150 to be rotated at a feed rate in a direction to move the table F in a rearward direction. The table continues to move back at a feed rate until the holding circuit through switch 187' for the relay 316 is broken by the opening of the switch 187' under the action of the control member 190' by the engagement of the gauge finger thereof with the rearwardly facing gauge surface of the repeat control rod 197'. When the holding circuit for the operating solenoid 359 of relay 316 is broken by the opening of switch 187', the normally open contacts 360, 361 open, breaking the holding circuit for the operating solenoid 302 of table back control relay 303, opening the normally open contacts 304 thereof, deenergizing the operating solenoid 133' of the clutch S', whereupon the clutch returns to neutral position and the table stops in the position in which it is desired to move it.

After the boring or other operation is completed, the table may be moved to the next index position by depressing the table continuous feed forward push button switch 172 which establishes a circuit from the line L-1 through the stop all push button switch 183, wire 240, normally open contacts of table continuous feed forward push button switch 172, which contacts are now closed, wire 306, operating solenoid 307 of relay 308 to L-2. Energization of the operating solenoid 307 of relay 308 closes the normally open contacts 310, 311, 312 thereof. The closing of the normally open contacts 310 establishes a holding circuit for the relay from the wire 240 through switch 187', which is now closed, wire 313, contacts 310 to wire 306. The closing of normally open contacts 311 of relay 308 establishes a circuit from the wire 240 through contacts 311, wire 314, normally closed contacts 315 of relay 316, which contacts are now closed, wire 317, operating solenoid 318 of relay 319 to L-2. Energization of the operating solenoid 318 of relay 319 closes the normally open contacts 320 thereof establishing a circuit from the line L-1 through contacts 320, which are now closed, wire 321, solenoid 134' of clutch S' to L-2.

Energization of the operating solenoid 134' of clutch S' shifts the clutch element 127' into engagement with the clutch element on the hub of the gear 125' causing the screw 150 to rotate and the table to feed in a forward direction. This forward movement of the table continues until the switch 186' is closed by the gauge finger of the control member 190' riding up upon the surface of the control rod 197'. When the switch 186' is closed, a circuit is established from the wire 240 through the switch 186', wire 354, normally closed contacts 355 of relay 297, which contacts are now closed, wire 328, contacts 353 of relay 319, wire 330, operating solenoid 331 of relay 332 to L-2. Actuation of relay 332 in turn actuates relay 338 in a manner previously described closing the normally open contacts 341 of the latter, establishing a circuit from the wire 240 through the contacts 341, wire 282, operating solenoid 283 of relay 284 to L-2. The closing of normally open contacts 285 of relay 284 establishes a circuit from the line L-1 through contacts 285, wire 286, operating solenoid 106 of clutch P to line L-2, initiating rapid traverse of the table  The table continues to move in a forward direction at rapid traverse rate until the gauge finger of the control member 190' drops into the next contol groove 196' in the control rod 197' whereupon the operation of stopping the table, previously described, is repeated.

As previously mentioned, the various machine tool elements are "plugged" to a stop, with the result that they do not drift but stop in the exact predetermined desired position to within a fraction of a thousandth of an inch. The position can be checked on the dial indicator.

*Automatic positioning by use of end measuring rods*

Figure 17:
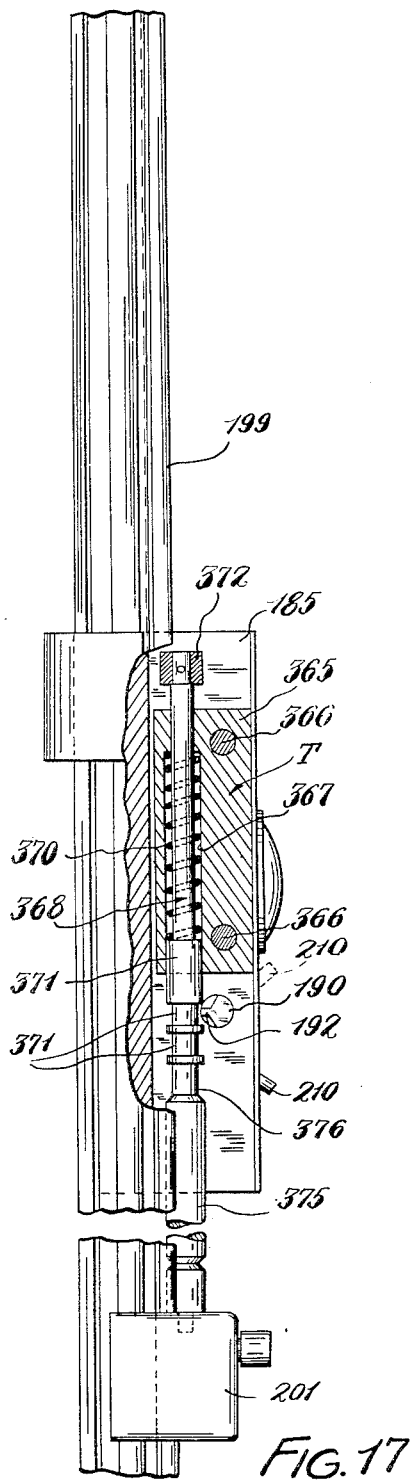
Fig. 17 is a sectional view approximately on the line 17—17 of Fig. 16.
Figure 16:
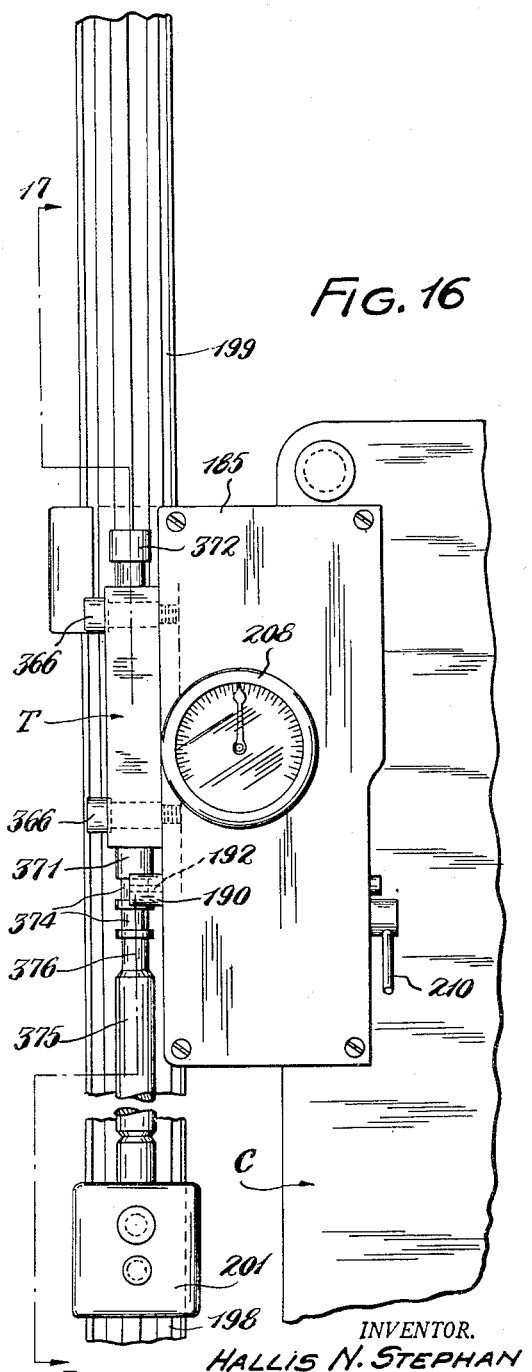
Fig. 16 is a view somewhat similar to Fig. 7 showing a mechanism by which the spindle head can be automatically positioned by the use of conventional end measuring rods.
Figure 10:
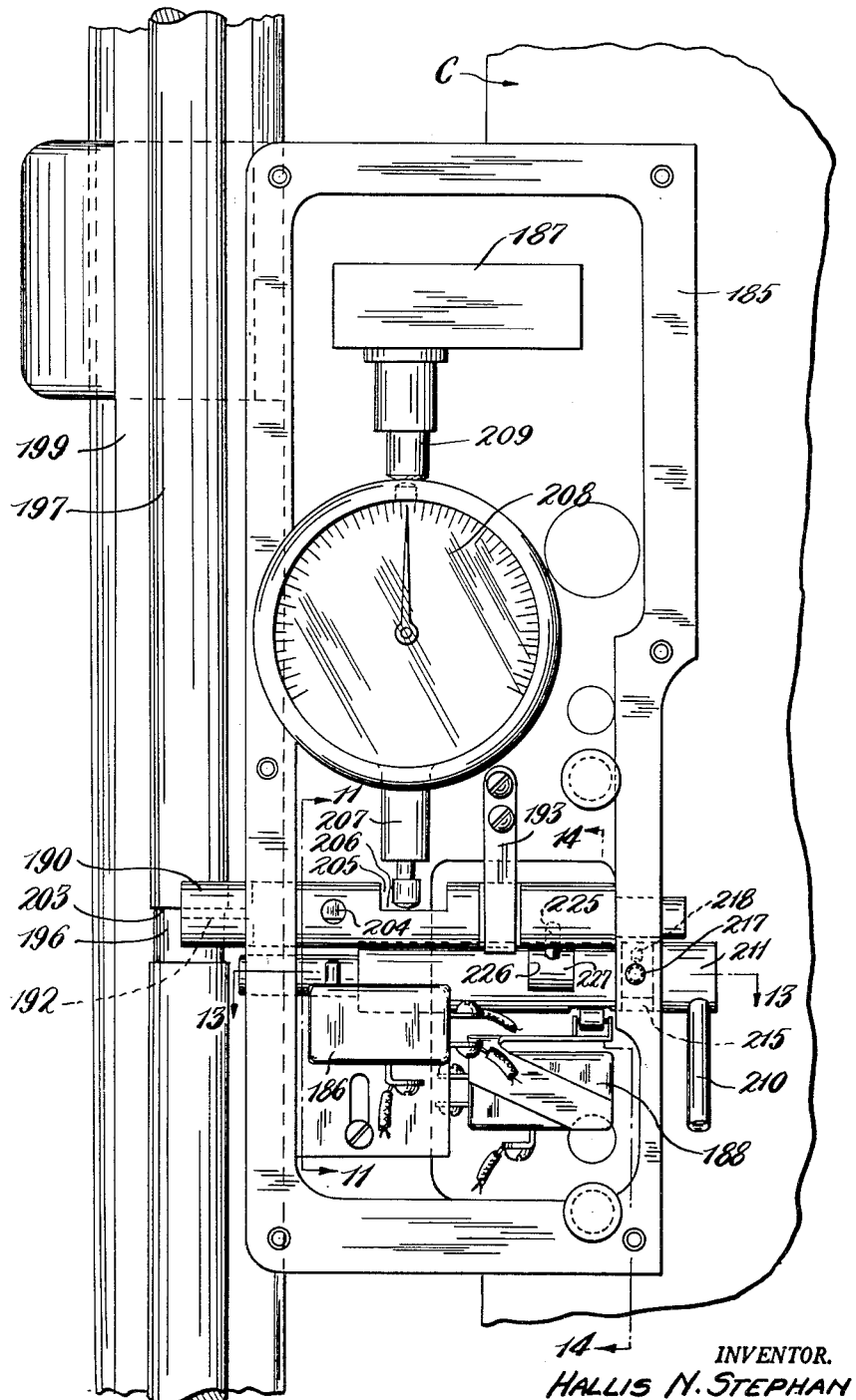
Fig. 10 is an enlarged view of a portion of Fig. 7.

The present invention also contemplates the provision of means by which conventional end measuring rods may be utilized with the repeat position control mechanism for automatically indexing or positioning the spindle head, table or saddle provided with the repeat position control mechanism. For this purpose an adapter, indicated generally by the reference character T and clearly shown in Figs. 16, 17, is secured to the housing 185 and has a movable stem which cooperates with the gauging finger 192 on the control member 190 and engages with a conventional end measuring rod to cause actuation of the automatic control member 190 when the spindle head, table or saddle, as the case may be, moves to a predetermined position relative to the end measuring rod.

The adapter T comprises a block 365 which is attached to the side of the housing 185 of the repeat control mechanism by two bolts 366 which extend through openings through the block and are threaded into openings in the housing wall. The block 365 has a bore 367 therethrough in which an adapter stem 368 is slidingly positioned and which stem is urged downwardly by a spring 370. The upper end of the bore 367 is reduced to form a shoulder against which one end of spring 370 engages. The upper portion of stem 368 is reduced in diameter to slide in the reduced portion of the bore and the lower portion thereof is enlarged, as at 371, to slidingly fit into the major portion of the bore and provide a shoulder against which the lower end of the spring 370 presses. The upper end of stem 368 projects above the block 365 and a collar 372 is attached thereto and engages the top surface of the block to limit downward movement of the stem by the spring.

The lower portion of the stem 368 has a pair of grooves 374 which correspond to the grooves 196 of the control rod 197 described hereinbefore. Normally, the spring 370 urges the stem 368 downwardly to the limit determined by the collar 372 and the finger 192 is positioned to extend upwardly and to rest against the portion 371 of the stem, corresponding to the position shown in broken lines in Fig. 9.

A suitable end measuring rod 375 is positioned in the groove 198 of the splined shaft 199 and is supported by the anvil 201 similarly to the control rod 197 described previously. The upper end of the measuring rod is adapted to be engaged by the lower end portion 376 of the adapter stem 368 when the control housing 185 descends, to thereby block the descent of the stem and cause the housing and the control member 190 to move downwardly relative to the stem so that the finger enters the upper groove 374.

Assuming that the control mechanism for the spindle head is operated as described under the heading "Repeat position control," the spindle head is above the position desired, at which time the stem 368 is in its lowermost position relative to block 365 with the control finger 192 resting against the stem portion 371. The head feed down continuous push button is depressed to close switch 168 which initiates rapid traverse downward movement of the spindle head in the manner described hereinbefore with reference to the repeat position operation, until the lower end of the stem 368 engages the end measuring rod, at which time finger 192 continues downwardly until it enters upper groove 374 and causes control member 190 to permit opening of switch 186. This action results in the spindle head being driven upwardly at feed rate until gauging finger 192 engages the top surface of the groove 374 and turns member 190 to actuate switch 187 and stop movement of the spindle head, as described previously.

Although only the control of the spindle head by the use of an end measuring rod has been described, it will be apparent that the table or saddle can be quickly and accurately positioned automatically in any predetermined position by the use of the proper end measuring rod with the repeat positioning control mechanism therefor, as described.

With the adapter T in position, it will be apparent that the spindle head can be moved vertically by hand and positioned in any desired location by the use of end measuring rods and the dial indicator 208. After the desired end measuring rod or number of end measuring rods have been positioned in the groove 198 in the splined rod 199, the shaft 145 is rotated by hand to move the spindle head C down until the gauge finger 192 drops into the upper groove 374. Thereafter, the shaft 145 is rotated in the reverse direction to raise the head until the dial indicator shows that the spindle head is in the desired location to which it is to be moved.

From the foregoing description of the preferred embodiment of the invention, it will be apparent that the objects heretofore enumerated and others have been accomplished and that there has been provided a novel and improved machine tool and, more particularly, a combined horizontal boring, drilling and milling machine including novel mechanism for indexing a machine tool element to one or a plurality of positions.

While the preferred embodiment of the invention has been described in considerable detail, it is to be understood that the invention is not limited to the particular construction shown and it is my intention to cover hereby all adaptations, modifications and uses thereof which come within the practice of those skilled in the art to which the invention relates and the scope of the appended claims.

Having thus described my invention, I claim:

1. In combination with a machine tool or the like having a supporting member, a member movably supported by said supporting member and power actuated means for moving said last named member relative to said supporting member at a plurality of different predetermined speeds, means for initiating operation of said power actuated means to move said supported member at one of said speeds, electric switch means for controlling the operation of said power means subsequent to the initiation of its operation to move said supported member at one of its speeds, a rod-like gauge member having a plurality of longitudinally spaced signal means thereon intermediate its ends, signal detection means responsive to said signal means for effecting the operation of said switch means, said signal means causing said signal detection means to operate said switch means to discontinue operation of said power actuated means to move said supported member at said one speed and initiate operation of said power actuated means to move said supported member at a second of said speeds and subsequently stop said supported member in a predetermined position, means adapted to receive rod-type end measuring gauges for detachably connecting said gauge member to one of said first two mentioned members, and means for connecting said signal detection means to the other of said first two mentioned members.

2. In combination with a machine tool or the like having a supporting member, a member movably supported by said supporting member and power actuated means for moving said last named member relative to said supporting member in different directions, means for initiating operation of said power actuated means to move said supported member in one of said directions, electric switch means for controlling the operation of said power means subsequent to initiation of its operation to move said supported member in one of said directions, a rod-like gauge member having a plurality of signal means thereon intermediate its ends and longitudinally spaced there along, signal detection means responsive to said signal means for effecting the operation of said switch means, said signal means causing said signal detection means to operate said switch means to discontinue operation of said power actuated means to move said supported member in said one direction and initiate operation of said power actuated means to move said supported member in a second of said directions and subsequently stop said supported member in a predetermined position, means adapted to receive rod-type end measuring gauges for detachably connecting said gauge member to one of said first two mentioned members, and means for connecting said signal detection means to the other of said first two mentioned members.

3. In combination with a device having a supporting member, a member movably supported upon said supporting member and power actuated means for moving said last named member relative to said supporting member at a plurality of different predetermined speeds, means for initiating operation of said power actuated means to move said supported member at one of said speeds, electric switch means for controlling the operation of said power means subsequent to the initiation of its operation to move said supported member at one of its speeds, a rod-like gauge member having a plurality of longitudinally spaced abutment means thereon, a moveable control member adapted to cooperate with said abutment means for effecting the operation of said switch means, said abutment means causing said control member to operate said switch means to discontinue operation of said power actuated means to move said supported member at said one speed and initiate operation of said power actuated means to move said supported member at a second of said speeds and subsequently stop said supported member in a predetermined position, means adapted to receive rod-type end measuring gauges for detachably connecting said gauge member with one of said first two mentioned members, and means for connecting said movable control member to the other of said first two mentioned members.

4. In combination with a machine or the like having a supporting member, a member movably supported upon said supporting member and power actuated means for moving said last named member relative to said supporting member at a plurality of different predetermined speeds, means for initiating operation of said power actuated means to move said supported member at one of said speeds, electric switch means for controlling the operation of said power means subsequent to the initiation of its operation to move said supported members at one of its speeds, a cylindrical rod-like gauge member having a plurality of longitudinally spaced annular grooves forming abutment means thereon, a movable control member adapted to yieldably engage said gauge member and cooperate with said abutment means for effecting the operation of said switch means, said abutment means causing said control member to operate said switch means to discontinue operation of said power actuated means to move said supported member at said one speed and initiate operation of said power actuated means to move said supported member at a second of said speeds and subsequently stop said supported member in predetermined positions, means adapted to receive rod-type end measuring gauges for detachably connecting said gauge member to one of said first two mentioned members, and means for connecting said movable control member to the other of said first two mentioned members.

5. In combination with a machine tool or the like having a supporting member, a member movably supported upon said supporting member and power actuated means for moving said last named member relative to said supporting member at a plurality of different predetermined speeds, means for initiating operation of said power actuated means to move said supported member at one of said speeds, electric switch means for controlling the operation of said power means subsequent to the initiation of its operation to move said supported member at one of its speeds, control means comprising a first movable member having signal means thereon and a second member having signal detection means thereon responsive to said signal means upon relative movement therebetween for effecting the operation of said switch means, said signal means causing said signal detection means to operate said switch means to discontinue operation of said power actuated means to move said supported member at said one speed and initiate operation of said power actuated means to move said supported member at a second of said speeds and subsequently stop said supported member in a predetermined position, means for operatively connecting said control means to one of said first two mentioned members, and means comprising a rod-type end measuring gauge detachably connected to the other of said first two mentioned members in alignment with said first movable member for producing relative movement between said signal means and said signal detection means.

6. In combination with a machine tool or the like having a supporting member, a member movably supported upon said supporting member and power means for moving said last named member relative to said supporting member at a plurality of different predetermined speeds, means for initiating operation of said power actuated means to move said supported member at one of said speeds, electric switch means for controlling the operation of said power means subsequent to initiation of its operation to move said supported member at one of said speeds to discontinue operation of said power actuated means to move said supported member at said one speed and initiate operation of said power actuated means to move said supported member at a second of said speeds and subsequently stop said supported member in a predetermined position, control means comprising a first movable member having abutment means thereon and a second movable member adapted to cooperate with said abutment means for effecting the operation of said switch means, means for operatively connecting said control means to one of said first two mentioned members, said last named means slidably supporting said first movable member for linear movement, and means comprising a rod-type end measuring gauge detachably connected to the other of said first two mentioned members in alignment with said first movable member for producing relative movement between said first and second movable members.

References Cited in the file of this patent
UNITED STATES PATENTS

| | | |
|---|---|---|
| 2,236,881 | Rusnak | Apr. 1, 1941 |
| 2,339,435 | Stephan | Jan. 18, 1944 |
| 2,516,842 | Baker | Aug. 1, 1950 |
| 2,561,346 | De Vleig | July 24, 1951 |